US006936095B2

(12) United States Patent
North

(10) Patent No.: US 6,936,095 B2
(45) Date of Patent: Aug. 30, 2005

(54) AIR/PARTICLE SEPARATOR

(76) Inventor: John Herbert North, 21 Briar Court, Guardian Road, Norwich (GB), NR5 8PR ( * ) Notice: Subject to any disclaimer, the term of this patent is extended or adjusted under 35 U.S.C. 154(b) by 74 days.

(21) Appl. No.: 10/312,934

(22) PCT Filed: Jul. 5, 2001

(86) PCT No.: PCT/GB01/02993

§ 371 (c)(1),
(2), (4) Date: Dec. 30, 2002

(87) PCT Pub. No.: WO02/03845

PCT Pub. Date: Jan. 17, 2002

(65) Prior Publication Data

US 2004/0103785 A1 Jun. 3, 2004

(30) Foreign Application Priority Data

| Jul. 6, 2000 | (GB) | ................................................ 0016501 |
| Jul. 6, 2000 | (GB) | ................................................ 0016503 |
| Jul. 6, 2000 | (GB) | ................................................ 0016504 |
| Sep. 15, 2000 | (GB) | ................................................ 0022610 |
| Nov. 13, 2000 | (GB) | ................................................ 0027593 |
| May 23, 2001 | (GB) | ................................................ 0112472 |

(51) Int. Cl.$^7$ .................................................... B01D 45/12
(52) U.S. Cl. ............................ 96/403; 15/353; 55/337; 55/345; 55/425; 55/DIG. 3
(58) Field of Search ......................... 55/337, 345, 343, 55/346, 347, 349, DIG. 3, 425; 96/403, 405; 15/353

(56) References Cited

U.S. PATENT DOCUMENTS

| 1,127,896 | A | * | 2/1915 | Keller | ........................ 55/325 |
| 1,380,698 | A | | 6/1921 | Anspach | |
| 2,569,710 | A | | 10/1951 | Fitzpatrick | |
| 3,342,023 | A | | 9/1967 | Fleming | |
| 4,593,429 | A | * | 6/1986 | Dyson | ........................ 15/353 |
| 4,643,748 | A | * | 2/1987 | Dyson | ........................ 55/338 |
| 4,826,515 | A | * | 5/1989 | Dyson | ........................ 55/345 |
| 4,853,008 | A | * | 8/1989 | Dyson | ........................ 55/345 |
| 4,853,011 | A | * | 8/1989 | Dyson | ........................ 55/345 |
| 4,976,850 | A | | 12/1990 | Kulitz | |
| 5,062,870 | A | * | 11/1991 | Dyson | ........................ 96/400 |
| 5,078,761 | A | * | 1/1992 | Dyson | ........................ 96/400 |
| 5,090,976 | A | * | 2/1992 | Dyson | ........................ 55/337 |
| 5,145,499 | A | * | 9/1992 | Dyson | ........................ 55/337 |

(Continued)

FOREIGN PATENT DOCUMENTS

| DE | 857467 | 10/1952 |
| DE | 2152389 | 5/1973 |
| EP | 0489565 A1 | 6/1992 |
| FR | 734716 | 10/1932 |
| GB | 1505166 | 3/1978 |
| WO | WO 98/35601 A1 | 8/1998 |
| WO | WO 98/43721 A1 | 10/1998 |
| WO | WO 01/08544 A1 | 2/2001 |

Primary Examiner—Duane S. Smith
(74) Attorney, Agent, or Firm—Barnes & Thornburg LLP

(57) ABSTRACT

A method of separating particles from particle laden air having a multiple stage separator in which the first stage comprises a generally cylindrical chamber having a hollow central member extending axially from one end thereof with openings in its wall remote from the one end. The first separation step is achieved by introducing air tangentially into the chamber near its one end, establishing a rotating mass of air in the chamber causing heavier than air particles to migrate to the outer regions of the chamber. Suction is applied to the interior of the central member to cause an axial movement of air through the chamber such that particles near the walls of the chamber tend to continue in a generally rotational and axially progressive path into a particle collecting region of the chamber, while relatively particle-free air is drawn radially inwardly.

25 Claims, 24 Drawing Sheets

U.S. PATENT DOCUMENTS

| | | | | |
|---|---|---|---|---|
| 5,160,356 A | * | 11/1992 | Dyson | 55/345 |
| 5,267,371 A | * | 12/1993 | Soler et al. | 15/327.5 |
| 5,520,208 A | | 5/1996 | Schneider | |
| 5,846,273 A | * | 12/1998 | Dyson | 55/337 |
| 5,853,440 A | * | 12/1998 | Dyson | 55/337 |
| 5,893,936 A | * | 4/1999 | Dyson | 55/337 |
| 5,954,863 A | | 9/1999 | Loveless | |
| 6,141,826 A | * | 11/2000 | Conrad et al. | 15/347 |
| 6,251,168 B1 | * | 6/2001 | Birmingham et al. | 95/268 |
| 6,269,518 B1 | * | 8/2001 | Yung | 15/252 |
| 6,428,589 B1 | * | 8/2002 | Bair et al. | 55/318 |
| 6,502,278 B2 | * | 1/2003 | Oh et al. | 15/353 |
| 6,578,230 B2 | * | 6/2003 | Park et al. | 15/353 |
| 2002/0020154 A1 | * | 2/2002 | Yang | 55/337 |
| 2003/0159412 A1 | * | 8/2003 | North | 55/345 |

* cited by examiner

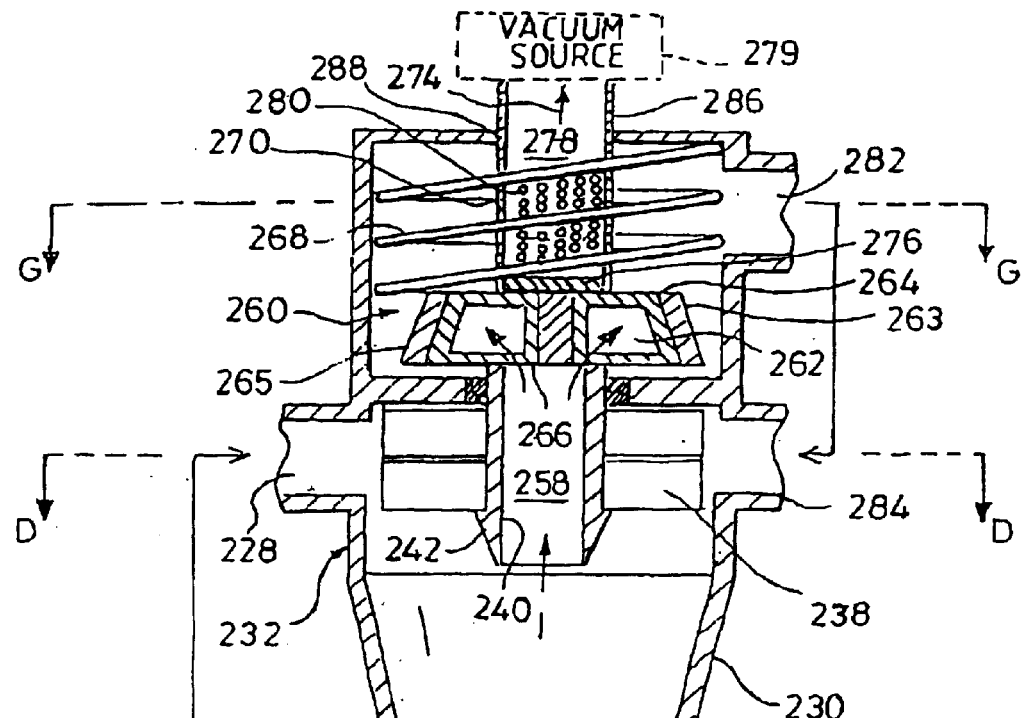
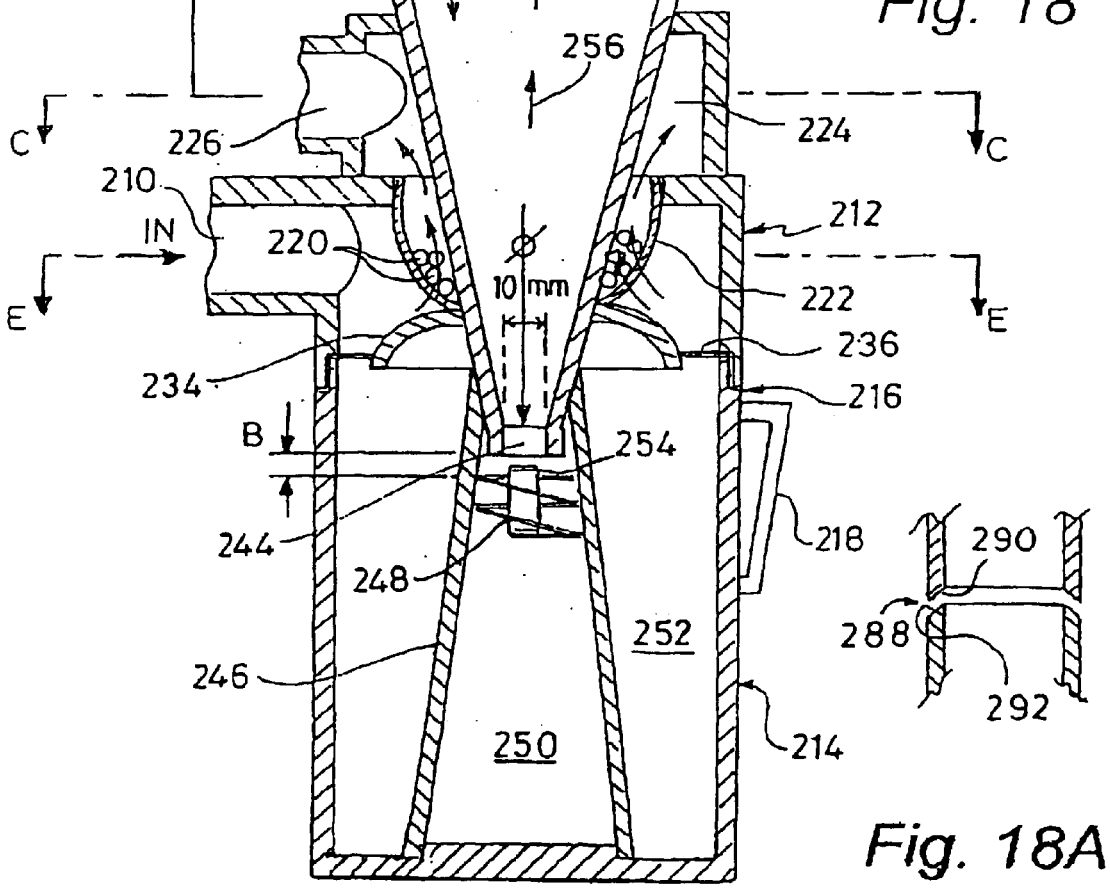
Fig. 18
Fig. 18A

AIR/PARTICLE SEPARATOR

FIELD OF THE INVENTION

The invention concerns separators which separate one material from another based on their relative densities. In a domestic context a cyclone-based vacuum cleaner is a separator for separating dirt and dust particles from air. Similar devices are employed in industrial and commercial processes, in laboratories and in clinical and hospital environments for separating particulate material from fluids—normally air or gaseous mixture; particulate material from liquids; or one liquid from another. In particular, but not exclusively the invention is applicable to vacuum cleaners in which one or more cyclones are set up within the apparatus for the purpose of efficiently separating dust and dirt particles from an incoming airstream.

BACKGROUND OF THE INVENTION

Various designs of vacuum cleaner have been developed over the years. The conventional cleaner draws dust laden air through a cloth or paper container in which all particles larger than the pore size of the material forming the wall of the container, will be retained.

Finer particles will pass through the porous wall and one or more filters are provided prior to the source of vacuum (usually an electrically powered motor driven fan or turbine), to trap these fine particles and prevent them being recirculated into the environment from which they have been removed by suction in the first place.

These filters will eventually become clogged and have to be cleaned and/or replaced. Long before that stage is reached however, the partial clogging of the filter(s) will reduce

OBJECTS OF THE INVENTION

It is an object of the present invention to provide an improved method and apparatus for separating fine particles from a flow of a gaseous mixture such as air, or a fluid, established by suction.

It is a second object of the invention to provide a particle separation method and apparatus in which the particle removal from an airstream is such as to significantly end the useful life of the final filter normally provided before the suction producing device in a vacuum cleaner.

DEFINITION

In the following text and in the claims (except where the context does not admit) references to air are to be construed to mean any fluid whether gaseous or liquid and particles to mean any particulate or fibre like material which has a greater density than that of the fluid.

SUMMARY OF THE INVENTION

According to one aspect of the present invention in a method of separating particles from particle laden air by means of a multiple stage separator in which the first stage comprises a generally cylindrical chamber having a hollow central member extending from one end axially thereof and which includes openings in the wall of the central member remote from the said one end, the first stage separation is achieved by:

1) introducing air tangentially into the chamber near the said one end thereof, the tangential entry in combination with an unapertured region of the wall of the central member establishing a rotating mass of air in the chamber, thereby causing heavier than air particles to migrate to the outer regions of the chamber under centrifugal force;

2) establishing an axial migration of the rowing mass of air by applying suction to the interior of the central member to cause an axial movement of air through the chamber before it can exit through the openings in the wall of the central member; and 3) selecting the suction force such that particles near the walls of the chamber will tend to continue in a generally rotational and axially progressive path into a particle collecting region of the chamber, while relatively particle-free air will be drawn radially inwardly, as it progresses axially, so as to exit to a second separation stage, through the openings in the central member wall.

According to another aspect of the present invention a multi-stage particle/air separator separating particles from particle-laden air comprises:

(1) a first stage comprising a cylindrical chamber, from one end of which internally extends a central hollow member having openings in the wall thereof remote from the said one end;

(2) an air inlet in the chamber wall by which particle laden air enters the chamber tangentially near the said one end thereof;

(3) a second dust/air separation stage to which air from the first stage chamber can pass via the openings in the wall and hollow interior of the central member;

(4) suction means for inducing air flow from the first stage to the second stage;

(5) a particle collecting region at the end of the chamber remote from the said one end, into which the particles migrate as a result of being separated from the air passing into the central member;

(6) an unapertured part of the wall of the central member adjacent the said one end of the chamber defining an annular region in the chamber, adjacent the air inlet thereto; and (7) the cylindrical region of the central member and the incoming tangential airstream combining to initiate a vortex within the chamber, so that incoming air is formed into a rotating mass of air in the chamber at the said one end thereof whereby centrifugal force causes heavier than air particles in the incoming air to migrate to the outer regions of the chamber, the suction causing axial migration of the rotating mass of air from the said one end of the chamber towards the other end thereof, and wherein the suction force being selected so that heavier than air particles will tend to remain in the radially outer regions of the chamber near the wall of the chamber as they progress rotationally and axially along the chamber towards the particle collecting region while relatively particle free air will migrate radially inwardly to exit through the openings in the wall of the central member.

Preferably a skirt extends from the end of the central member beyond the region containing the openings in the wall hereof, to define a narrow annular gap between the it and the wall of the chamber, so that particles in the dust collecting region which due to turbulence may rise up in the region towards the central member, are prevented from reaching the openings therein unless they migrate radially outwardly to pass through the narrow annular gap against the flow of the incoming particles.

Preferably an annular flange is provided around the central member between the unapertured and apertured regions of the wall thereof, so as to force the vortex of rotating air within the chamber away from the central member as it progresses along the chamber.

Preferably particles separated in a later separation stage are conveyed to a particle-collecting region via a passage extending through the central member of the first stage.

Preferably the passage communicates with the particle collecting region, of the cylindrical chamber of the first stage via valve means which is closed during air flow through the apparatus, and is opened after air flow ceases to allow particles collected upstream of the valve to pass into the particle collecting region of the chamber f the first stage.

The valve means may comprise a ball valve wherein the ball is lifted to close the valve by airflow established through the apparatus by the suction effect.

When the valve is closed, it is preferable that axial distance between the exit end of the passage in the central member and the ball is of the order of 52 mm.

The valve means may include a closure member which is held in an open condition by spring means.

The closure member may comprise a poppet so as to reduce the axial led of the valve housing, and if so the poppet may include a flat plate which moves nearer to and further away from the exit end of the central passage as the poppet moves between its closed and open positions. In this arrangement the distance between the plate and the exit end of the central passage, when the valve is closed, is typically of the order of 4 mm.

The passage which conveys particles separated in a later separation stage through the central member may instead communicate with a particle collecting region, which is separate from the first stage particle collecting region, so that particles separated by the first stage are collected separately from particles separated by the later stage, of the multiple stage separator.

In such an arrangement the separate particle collecting region may be formed by a tubular member ending centrally of the chamber from the lower end of the said central towards and sealingly engaging with the far end of the chamber, so as to define with the wall of the far end of the chamber an annular region which comprises the particle collecting region of the first stage, and a separate inner region for collecting particles from the later stage.

The tubular member may be separable from the end wall of the chamber.

In any event, the cylindrical chamber may be formed in two parts, a first part comprising a cylindrical region surrounding the central member and extending axially substantially to the same extent as the said central member, and a second part which can be sealingly joined to and in axial alignment with the first part to form an enclosure and which includes a closed end which is engaged by the free end of the tubular member to form the separate dust collecting chamber.

In any of the apparatus arrangements so far envisaged, a passage conveniently extends though the central member from the open in the wall thereof to an entrance in a second cylindrical chamber forming part of a second separation stage, through which air and any particles remaining therein pass from the first stage to the second stage enter. The second cylindrical chamber is of course located downstream of the first chamber and typically is situated beyond the said one end of the first chamber, remote from the dust collecting region of the latter.

Preferably the entrance in the second cylindrical chamber causes air to enter the chamber tangentially and this chamber includes a hollow central member which extends axially thereof over at least part of its length from the end thereof furthest from the first chamber.

The free end of the hollow central member may include at least one opening therein to provide an outlet for air and any remaining particles to exit from the second chamber. Alternatively the free end of the hollow central member is closed but the wall of the central member has apertures therein through which air and any remaining particles can exit from the said second chamber.

The central member in the second chamber conveniently comprises a vortex initiator for air entering the second chamber.

The entrance to the second chamber is preferably near the end thereof which is furthest from the first chamber.

A helical flange may be provided to protrude from the central member, thereby forcing circulating air in the second chamber to describe a helical path as it passes from one end of the chamber towards the other. The helical flange may comprise less than one complete turn, or one complete turn, more than one turn or a plurality of complete turns.

A rotatable turbine may be located in the second chamber for rotation about the chamber axis, and the blades of the turbine are aligned relative to the entrance in the second chamber so that the incoming tangential airstream produces rotation thereof. The turbine may comprise at least two sections which are axially spaced with the blades of one section out of phase with the blades of the other.

The turbine may be secured to the said hollow central member, and the latter is rotatable within the second chamber, and rotates with the turbine.

The said second chamber preferably includes a first generally cylindrical region and a second region extending axially therefrom which is frusto conical and whose diameter progressively reduces from that of the cylindrical region in a direction away therefrom. The included angle of the cone of which the frusto conical surface forms part typically lies in the range 100–140 degrees, and is preferably 120 degrees.

The second chamber preferably includes a third region, extending axially beyond the first frusto conical region, which is also frusto conical, but in which the diameter progressively reduces more slowly with axial distance from the cylindrical region than does the diameter of the first frusto conical region.

The apparatus may include a third separation stage, located downstream from the second stage, for separating out any particles remaining in the airstream which passes from the second stage to the third stage.

Typically the central passage of the second stage communicates with the third stage to allow air to pass into the third stage from the second stage.

Typically the third stage is also a generally cylindrical chamber, and conveniently air enters the third stage generally centrally of one end of the chamber and the third stage chamber includes a hollow central member, and a first outlet in the wall of the central member and a second outlet in the wall of the chamber. A deflector is preferably provided in the third stage to cause air entering the chamber to move radially outwardly so that any particles remaining in the air stream are radially displaced away from the centre of the chamber and axially away from the first outlet, in a direction to enter the second outlet.

The deflector conveniently comprises a conical lower end of the central member in the third stage, whose apex points towards the incoming airstream.

A helix may extend around the central member to introduce rotational and axial movement of the airflow through the third stage. In that event the second outlet is conveniently located axially beyond the exit end of the helix.

Irrespective of the features of the third stage chamber, the first outlet conveniently comprises a plurality of small openings in the wall of the central member in the third stage.

In a preferred arrangement the third stage includes a hollow rotary central member, driven by the turbine in the second stage, for imparting rotational motion to the incoming air stream entering the third stage and thereby causing particles remaining in the air entering the third stage to migrate outwardly under centrifugal force, and a second outlet in the third stage is located so as to collect any such particles for return to an earlier separation stage, and a first outlet is located at the opposite end of the chamber from the end in which the incoming air enters, so that after being rotated the air has to change direction and move axially though the chamber before it can leave via the first outlet.

Whether a rotary member is included or not, the second outlet preferably communicates via a passage with a second inlet in the wall of the second stage chamber, and preferably this second outlet in the second stage wall causes air entering the second stage chamber to do so tangentially of the chamber, and in the same direction as the air is already rotating in the second stage chamber. In practice it is found that the rotation of the air in the second chamber generates a suction effect at the second inlet (supplied with air from the third chamber), the suction effect being at least as great as, the suction effect at the said first outlet in the tired stage.

In all embodiments of the third stage an apertured sleeve or gauze preferably surrounds at least part of the central member in the third stage, to reduce the chance of particles which have been deflected therethrough from returning to leave the third stage via the first outlet.

Level detection means may be provided in the or each particle collecting region, to initiate an alarm and/or cease operation of the suction producing device in the event that the particles collected therein exceed a given volume.

BRIEF DESCRIPTION OF THE DRAWINGS

In the accompanying drawings different embodiment of particle separation apparatus are illustrated, and will now be described, each incorporating one or more aspects of the present invention, as follows:

FIG. 4A is a scrap view of cross members 84 and guide 82 of FIG. 4:

FIG. 17A corresponds to the perspective view of FIG. 13A.

FIG. 18 illustrates another embodiment of a cyclone vacuum separator of the invention.

FIG. 18A illustrates a rotary seal of FIG. 18.

DETAILED DESCRIPTION

Figure 1:
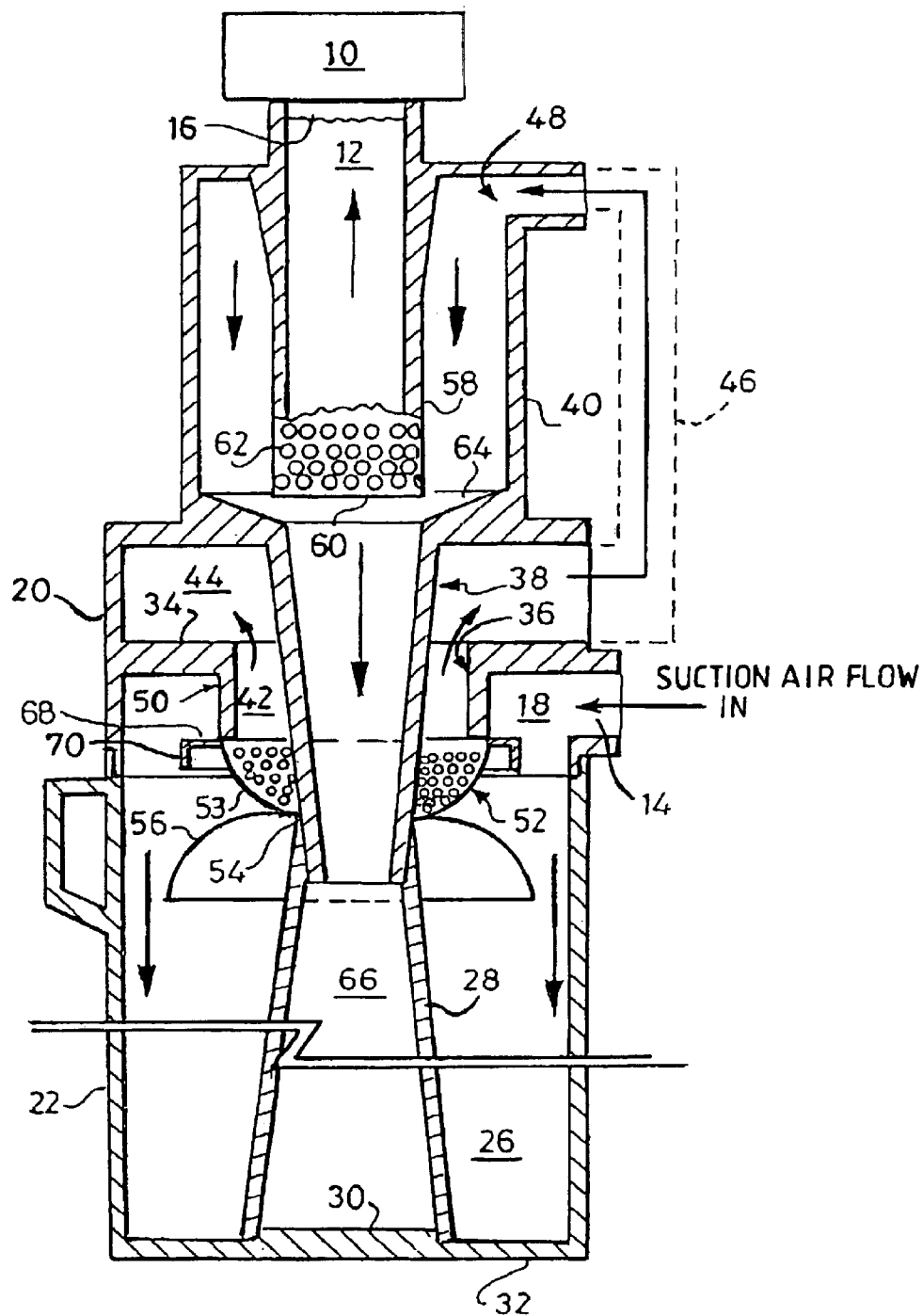
FIG. 1 is a cross-sectional view of the separator according to the invention.

In FIG. 1 an electric motor driven fan or turbine 10 provides a source of suction at the upper end of passage 12 to draw air through the different stages of the apparatus, as will be described, from an inlet passage 14.

In the case of a domestic or commercial vacuum cleaner 14 will be connected to a hose (not shown) having a dust collecting head of known design (not shown) at its far end. The last part of the hose may in known manner be rigid.

In the case of a device for separating particles from air from apparatus such as in a laboratory or industrial or commercial environment, the inlet 14 will be connected to the enclosure from which dust/particle laden air is to be extracted.

A filter 16 (which may be removable for cleaning or replacement) may be located immediately prior to the suction source 10, although in some embodiments this may be dispensed with in view of the very high efficiency of such embodiments at removing particles from the incoming air.

The inlet passage 14 introduces air into the upper end 18 of a two part cylindrical chamber 20, 22, sealingly joined at 24 but separable to allow particles collected from the airstream to be emptied.

Particles are collected from a first separation step (which occurs within 20, 22) in the annular space 26 at the lower end of 22 formed by a central hollow frusto-conical housing 28 which extends centrally of 20, 22 to sealingly engage around a circular platform 30 upstanding from the flat, closed end 32 of 22. The space within 28 serves as a second particle-collecting region, for retaining particles separated from the airflow by a second separation step (to be described).

The upper end of 20 is closed at 34 but includes a central circular opening 36 through which a frusto-conical extension 38 of a second cylindrical chamber 40 can pass in a downward manner. An annular space 42 between the wall of the opening 36 and the extension 38 allows air to leave 20, 22 and pass into an annular manifold 44 from which it can pass via a passage (shown dotted at 46) to an inlet port 48 at the upper end of the chamber 40.

Inlet 48 introduces air into the interior of 40 in a tangential manner in a similar way to that in which 14 introduces air into the region at the upper end of 20, 22.

Centrally of 18, a collar 50 extends axially down onto 20, the interior of the collar communicating with the opening 36 in the end 34 of 20. The collar is generally cylindrical and terminates in a part hemispherical dome 52 which extends down to and surrounds the frusto-conical extension 38, where it is sealingly joined at 54. A skirt 56 which is also generally part hemispherical and open at its lower end, extends from the join 54.

The dome 52 is perforated by a large number of very small holes 53. The skit is non-perforated.

In operation, the incoming tangential rush of air through 18 sets up a rotating mass of air around 50 which can only exit via holes 53, which are axially displaced from the region into which the air is introduced. This causes the rotating mass of air to migrate axially as it rotates, so setting up a so-called vortex flow within 20, 22 and heavier than air particles will be flung towards the cylindrical wall of the chamber 20. The particles will axially migrate with the vortex and once in a downwardly spiralling trajectory will tend to continue in that manner axially down the chamber 20, 22 through the annular gap between the skirt 56 and the interior of 22.

Once the particles are below the skirt 56, there is little tendency for them to migrate back up the chamber, even if turbulence exists below the skirt, and they will tend to congregate in the annular region 26.

Thus although air entering at 18 may be laden with heavier than air particles (dust, hairs, grit and the like in the case of a vacuum cleaner), muck of these particles will be separated from the air before it passes through the openings 53 in the inverted dome structure 52. Therefore the air passing up through 42 and via 44, 46 and 48 into the upper end of the second separation stage, will be substantially depleted of particles, relative to that entering at 14.

As mentioned earlier, suction is applied to the upper end of passage 12, which is formed by a hollow generally cylindrical housing 58 which extends axially of the cylindrical chamber 40 to terminate near its lower end.

The lower end f housing 58 is closed at 60 but around that close end, the wall f 58 is perforated with a large number of small holes 62, so that suction applied at 12 will cause air from within 40 to be sucked into the interior of 58 to pass axially therethrough in an upward sense.

This suction causes air to be drawn in through 48 from 44 so establishing the airflow through the chambers and passage 46, from inlet 14 to the suction device 10. The latter includes an outlet through which air, removed from the apparatus can exit to the atmosphere.

The external surface of the upper end of housing 58 is frusto-conical, and in combination with the tangential inflow of air, creates a rotating mass of air around the housing 58, which, since it must pass axially down the housing 40 before it can leave via holes 62, becomes a vortex which accelerates as it reaches the lower end of the cylindrical region of 40 due to a sudden frusto-conical reduction in the internal cross-section of 40, as denoted by 64. The acceleration increases the centrifugal forces on any heavier than air particles relative to the air molecules, so causing any such particles to carry on spiralling downwardly accelerating as they do due to the frusto-conical cross-section of the interior of extension 38 of the chamber 40.

The particles spiral down into the interior 66 of the housing 28, where they tend to remain If the airflow through 40 is high enough, the rotating and axially descending vortex of air may substantially bypass the openings 62 in the wall of 58 and continue to spiral downwards carrying the particles in the spiralling airstream. At some point the effect of the closed end 30 and the enlarging cross-section of housing 28 will cause the rowing mass of air to invert and begin ascending centrally of the downward spiral of air passing through 38 and 28, but in order to do so, the sudden acceleration and acceleration of the air molecules as they change direction, will in general be too sudden to allow heavier than air particles present in the airs, to follow the same tortuous path as the air does, and such particles will become separated from the airstream and remain trapped in 28.

The two stages of separation so achieved, result in substantially all heavier than air particles remaining in 26 or 28 and largely particle-free air passing out through 12 and 10.

An improved separation can be achieved in the first stage by providing an annular flange 68 around the collar 50 at the junction between the perforated and unperforated wall sections. This serves to accelerate the rotating mass of air just before it reaches the perforated region 52, thereby forcing any heavier than air particles to migrate radially even further from the collar.

The effect is further enhanced by ending the periphery of the flange 68 in an axial manner to form a cylindrical lip 70 which extends in the direction of movement of the vortex in the chamber 20, 22.

Typically the diameter of the collar 50 is in the range of 5–8 cm and the radial extent of the flange will be if the order of 1 cm and the lip can extend axially from the flange by a similar distance of the order of 1 cm.

The separator may be used to separate particles from air which also contains liquid droplets such as water. The presence of the flange 68 and lip 70 reduces the risk of liquid droplets from being entrained in the air exiting via holes 52, since they, like any heavier than air particles, will be forced to adopt a high rotational speed to pass around flange 68 and will therefore be even further removed by centrifugal force from the inner regions of the chamber 20, 22.

Figure 2:
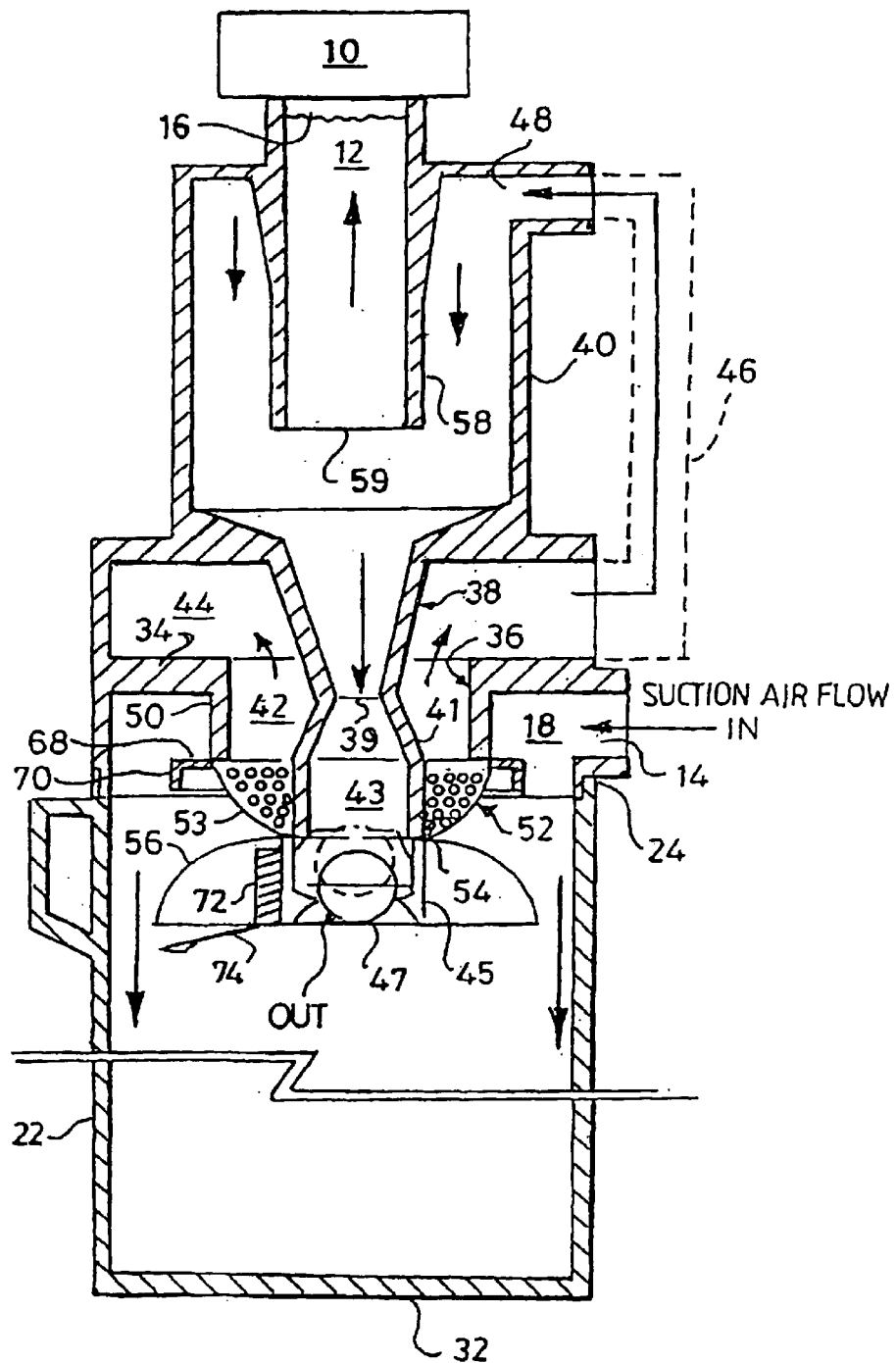
FIG. 2 illustrates an alternative two-stage separator.

FIG. 2 illustrates an alternative 2-stage separator in which air flow is established in a similar way as in FIG. 1 from inlet 14 to suction device 10, and the same reference numerals are employed to denote parts which are common to the two arrangements.

The main operational difference is the shortening of the length of housing 58 and the removal of the closed end 60 and a 62. The lower end of 58 is now open at 59.

Secondly the frusto-conical extension 38 of housing 40 now converges more sharply to define a small diameter neck 39 below which the extension reverses the frusto-conical configuration to form a trumpet-like end 41 which terminates in a cylindrical region 43. From below 43 (although not shown as such) the 2-bin configuration of FIG. 1 may be employed, so that particles from 43 drop into a region 66 and those from around the skirt 56 into an annular region 26. As shown, a single bin or valve may be employed. Thus as shown, the lower end of 43 is formed as a cage 45 for a light weight ball 47, which when airflow is established, is drawn up to close off the lower end of 43 (as shown in dotted outline), the junction between 43 and 45 being of reduced diameter to form a valve seating. The lower end of 45 is partially obstructed to retain the ball.

A microswitch 72 is also shown in FIG. 2 having an actuator arm 74, such that when particulate material in the chamber 20, 22 becomes high enough to lift the arm 74, the switch is operated and an alarm is initiated (audible or visible or both), (not shown) and/or power to the suction source 10 (e.g. current to the fan motor) is cut off to prevent further operation until the chamber 20, 22 has been emptied.

The level detecting switch may be fitted to the FIG. 1 embodiment if desired, and one may be located in the space 66 and another in the space 26, or one in the space that, from experience, always fills up first. In general this will be the annular region 26.

Figure 2A:
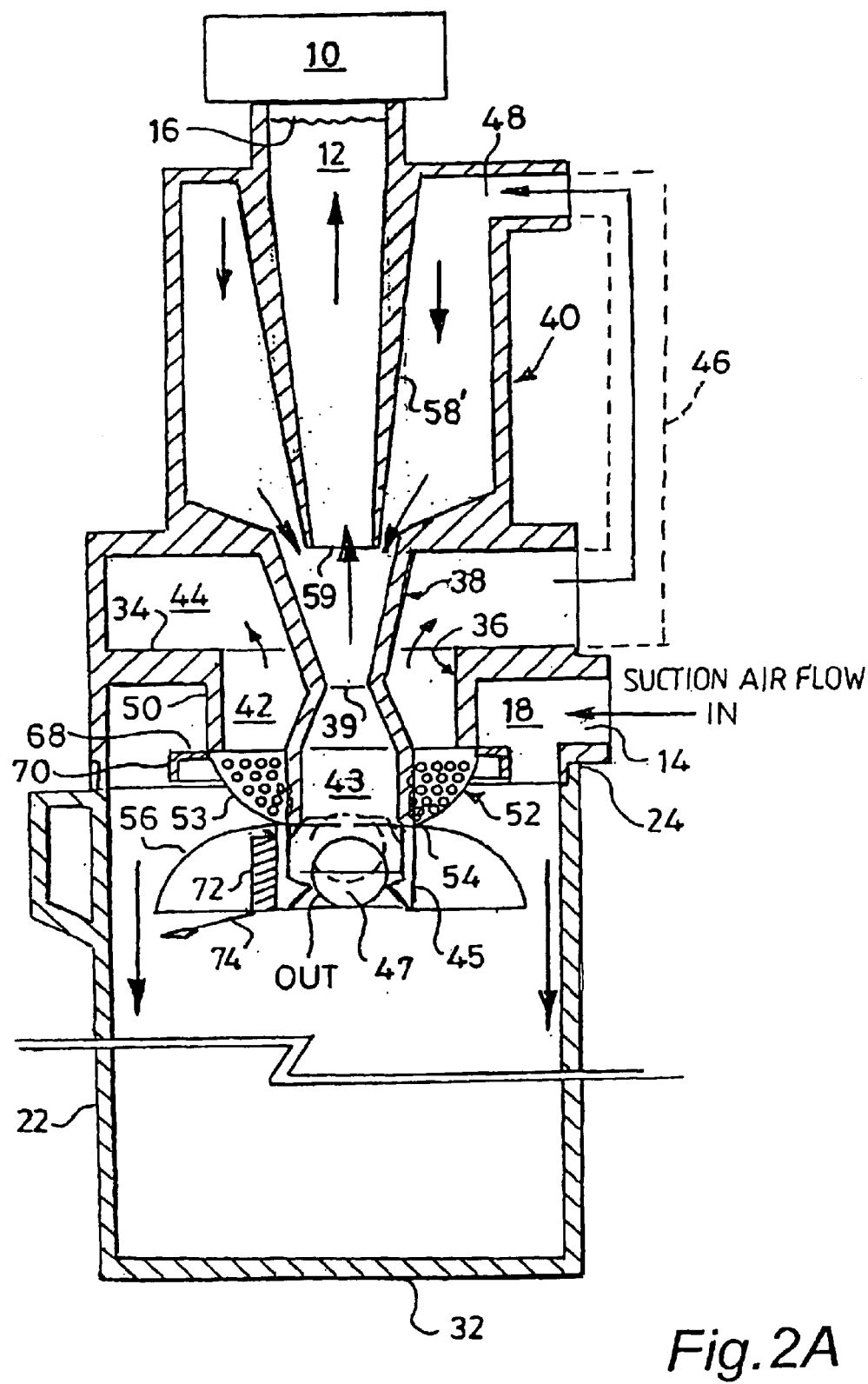
FIG. 2A is a modification thereof.

Better separation in the chamber 40 is achieved if the housing 58 is extended and tapered to protrude into the upper end of 38 as shown at 58' in FIG. 2A.

Figure 3:
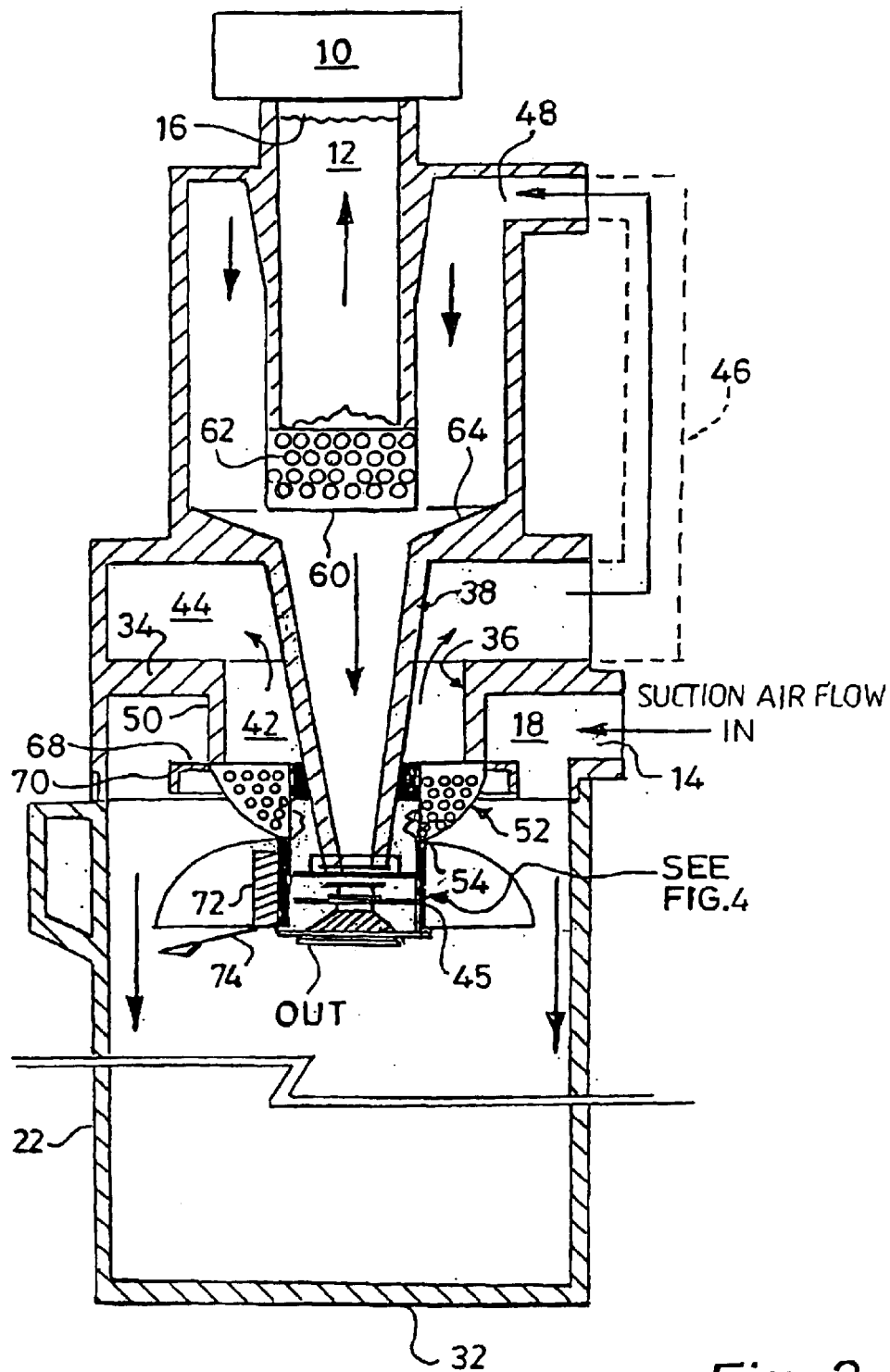
FIG. 3 illustrates a further alternative two-state separator.

FIG. 3 illustrates a further alternative 2-stage separator similar to FIG. 1 (and to that end the same reference numerals have been employed as appropriate), in which a valve has been incorporated, as in FIG. 2, but in which a different type of valve is shown from that shown in FIG. 2. The valve is shown in more detail in FIG. 4, and comprises a conical poppet 74 at the lower end of a spindle 78 at the upper end of which is a cup 78. A valve seating 80 retains an O-ring 82 against which the conical surface of the poppet 74 is forced, to close the valve once airflow has been established through the apparatus. The spindle 76 extends through the poppet and is slidingly received in a guide 83 in a cross member 84 which extends across the open lower end of the housing 45. The cross member 84 and guide 82 are shown in the scrap view of FIG. 4A.

Particles can pass down through the open end of tube 38 during operation, and remain above the poppet 74 until airflow ceases, whereon the poppet drops and particles can fall past the conical surface of the poppet and around the cross member 84, into the common bin 22.

A spring (not shown) may be fitted between the conical surface 74 and the upper end of the enclosure 86, (or between the cup 78 and the end 86) so that as soon as airflow drops, the poppet valve opens under the action of the spring.

Figure 4:
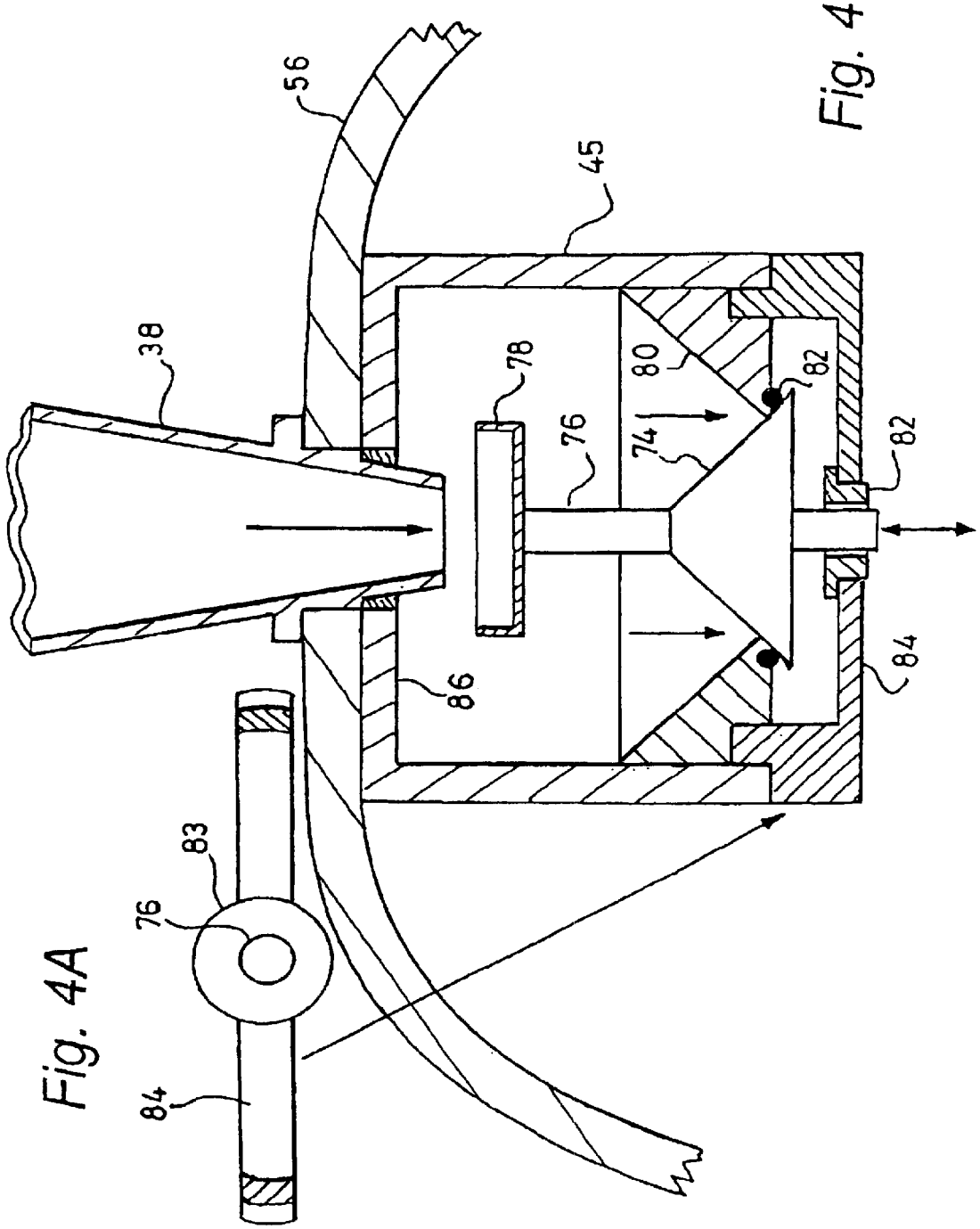
FIG. 4 illustrates a valve of FIG. 3 in greater detail.
Figure 5:
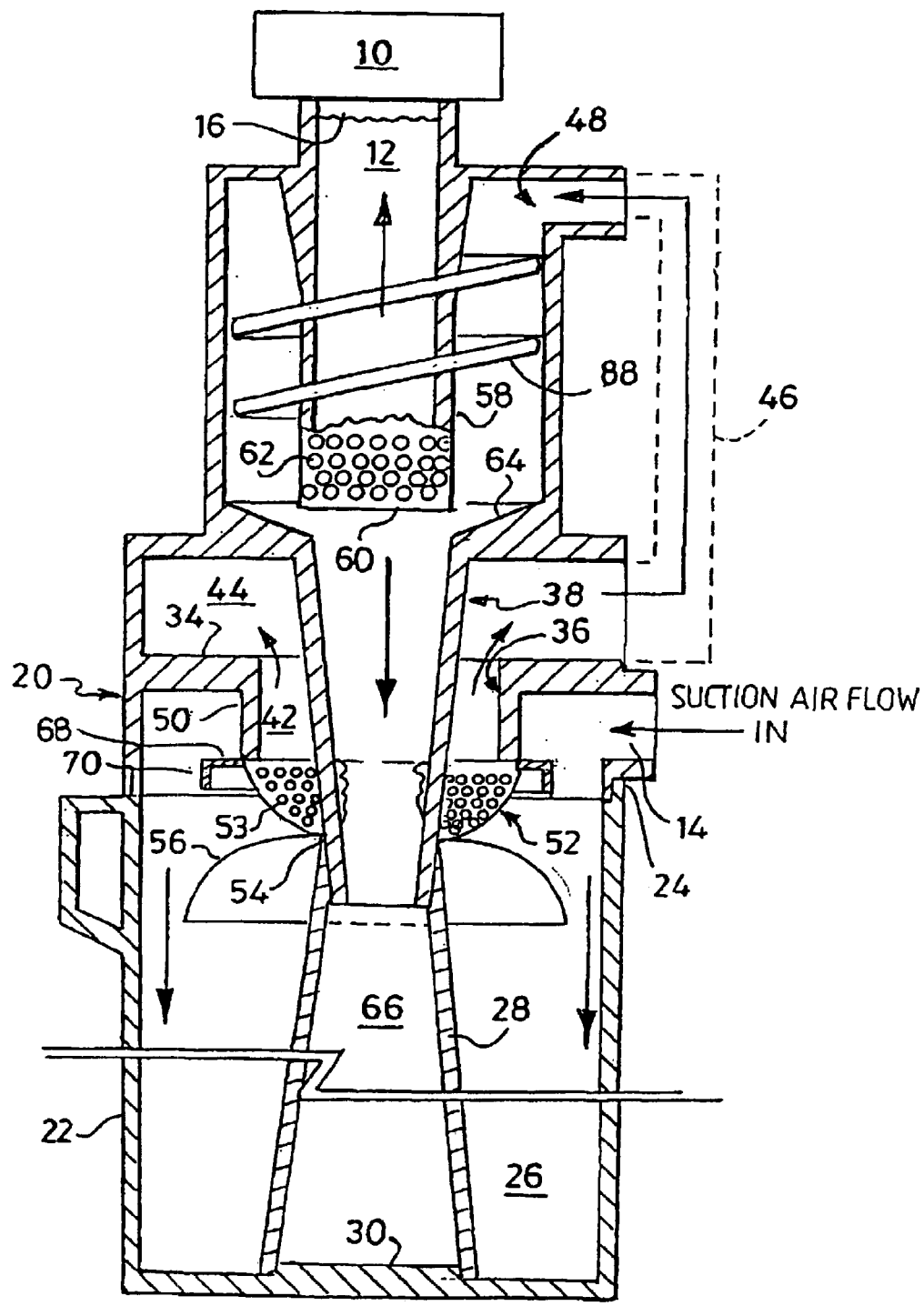
FIG. 5 is a modification of the embodiment of FIG. 1.

FIG. 5 shows an arrangement that is similar to that of FIG. 1 (and similar reference numerals have been employed throughout to denote similar components). Particles are collected in two bins as in FIG. 1, so there is no need for a valve such as shown in FIGS. 2 to 4, although it is to be understood that mixing of the separated particles in bin 66 with air circulating in the frusto-conical vortex separation sage 38 is better prevented if a valve were to be provided between 38 and 66.

The main difference between FIGS. 5 and 1 is the provision of a helical baffle 88 around the central hollow member 58 in the second separation stage housed in chamber 40. This prevents air entering the chamber 40 from passing in a straight line to the open 62 at the lower end of 58 and forces the airstream to continue to describe a circular route (albeit while progressing axially via the turns of the helix). This introduces centrifugal forces on the rotating air mass and thereby on heavier than air particles in that airstream, which will therefore migrate to the radially outer regions of the helical path followed by the airstream, and will be less likely to be caught up in the radially inward flow of air through the openings 62 to enable it to exit the chamber under the suction force from 10.

Figure 6:
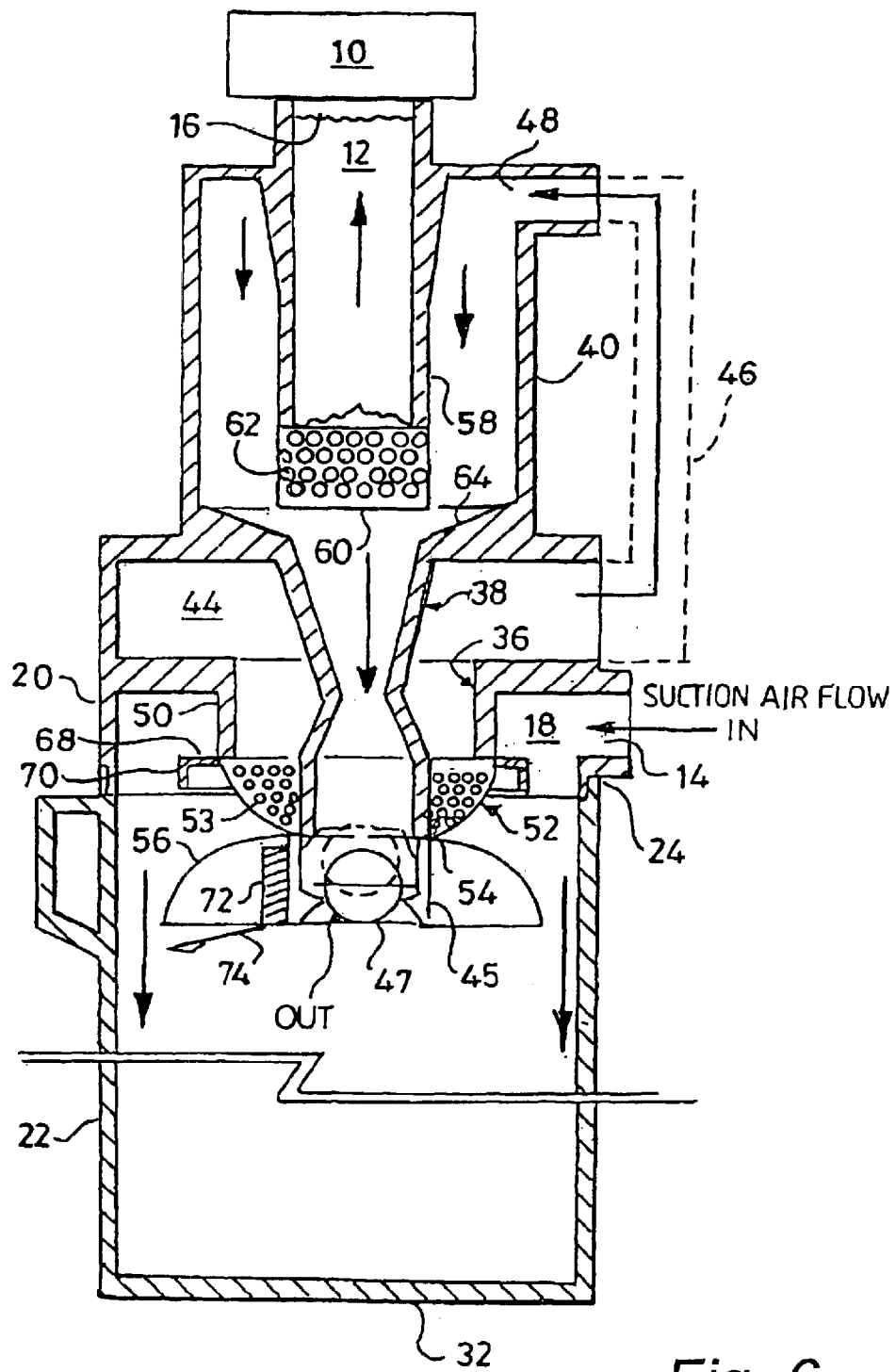
FIG. 6 is a modification of the embodiment of FIG. 2.

FIG. 6 shows a variation on FIG. 2 in which the lower end 60 of tube 58 (in the second stage) is closed off and the exit for the air from the chamber 40 is provided by a large number of small openings 62 in the wall of the tube, as provided in the embodiment shown in FIGS. 1 and 5. The arrangement benefits from the simplicity of the single particle collecting bin but therefore requires the addition of a valve as described in relation to FIG. 2 and a level sensing microswitch 72 is also shown associated with the bin.

Figure 7:
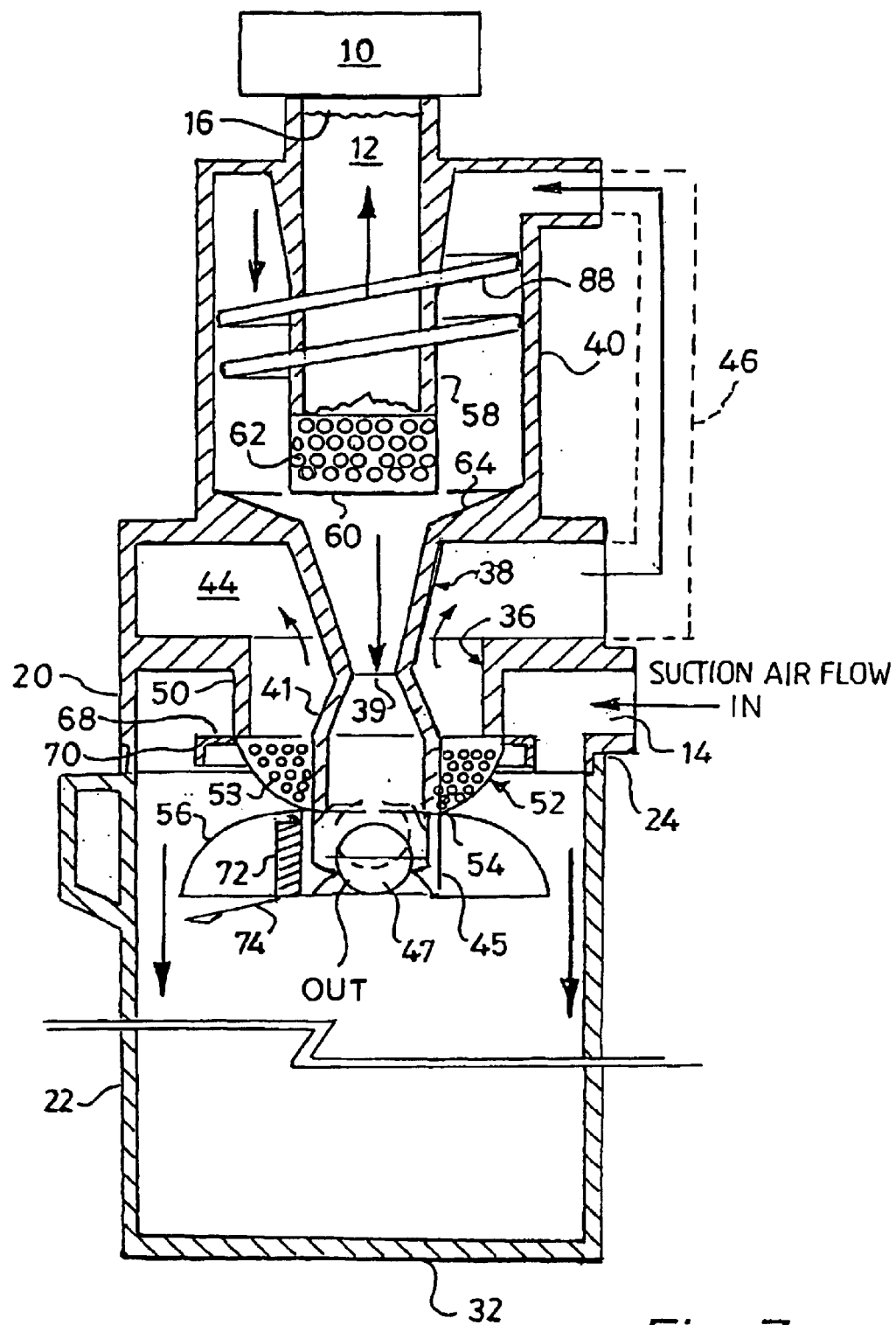
FIG. 7 shows a combination of the embodiment of FIGS. 5 and 2.

FIG. 7 shows how the helical baffle of FIG. 5 can be combined with the simplicity of the single bin and the improved second stage separation associated with the necked frusto-conical vortex separation on chamber 38, 41 described in relation to FIG. 2, to achieve a further overall improvement in particle separation for a given airflow and partciel size distribution. As before items which are common to earlier embodiments are identified by the same reference numerals as have been employed in earlier figures.

Figure 8:
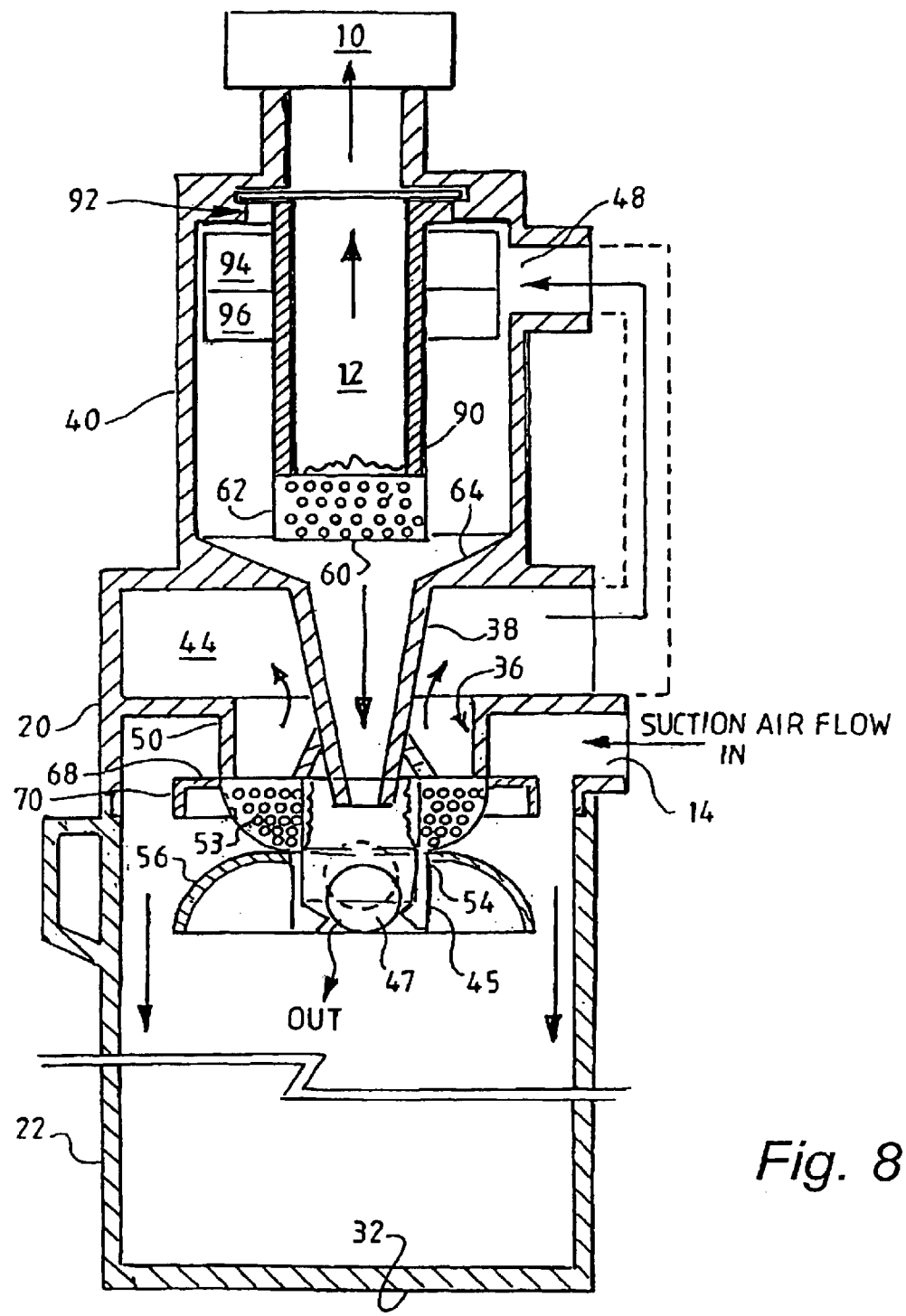
FIG. 8 illustrates a modification of the embodiment of FIG. 6.
Figure 9:
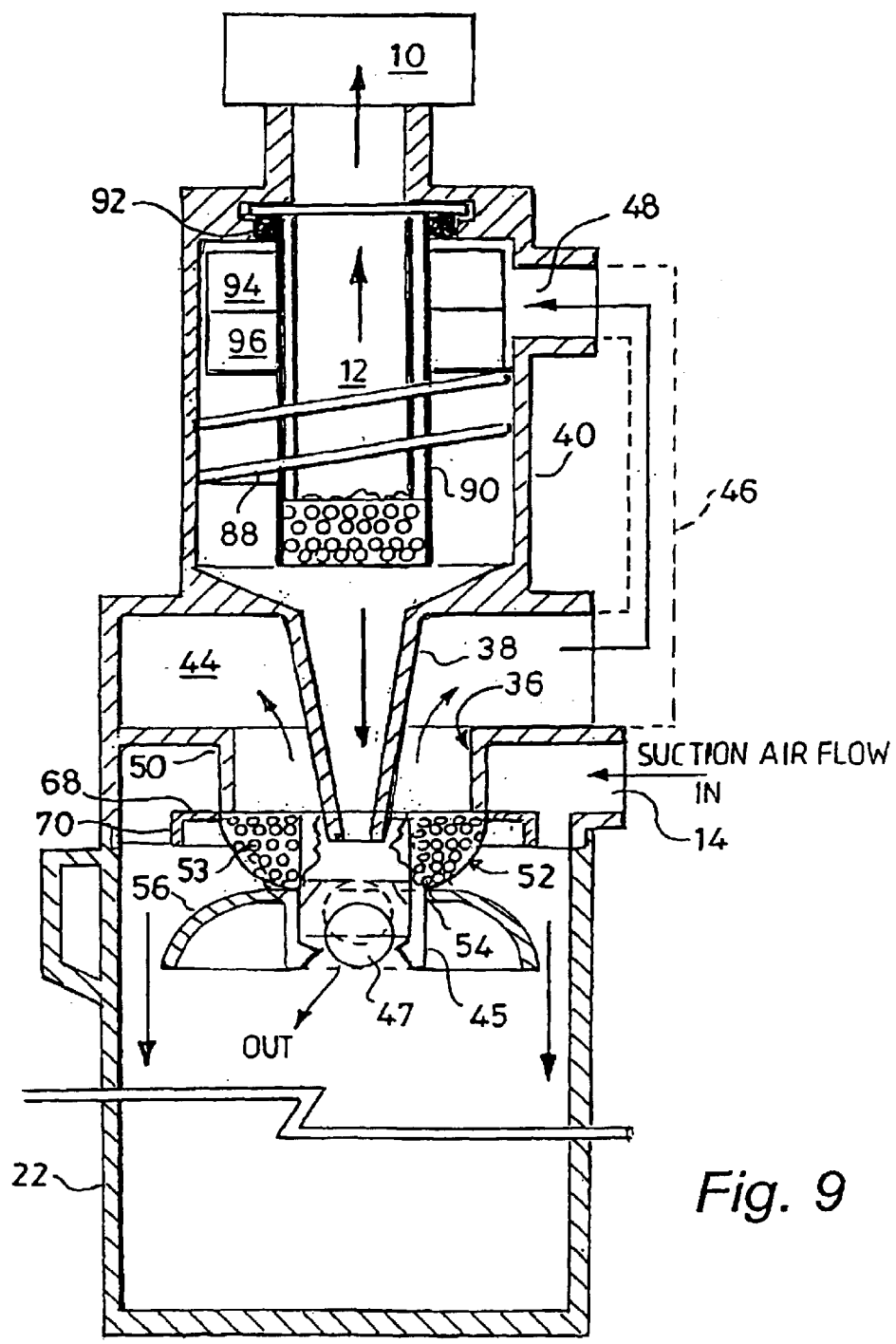
FIG. 9 illustrates a modification of the embodiment of FIG. 7.

FIGS. 8 and 9 show how the designs of FIGS. 6 and 7 respectively can be modified further improve separation in the second stage. In each case the stationary tube 58 is replaced by a rotatable tube 90 supported for rotation about its central axis by a bearing 92 in the upper end wall of the housing 40. Situated in general alignment with the air inlet 48 and fixed to the tube 90 is a two element turbine 94, 96 (although it is to be understood that a single turbine element such as 94 or 96 may be used in place of the two element arrangement). Where two elements are employed the one is mounted with its blades out of phase relative to those in the other, so as to effectively double the number of turbine blades on which the incoming airstream acts. This increases the speed of rotation.

Being attached to 90, the rotation of the turbine(s) causes 90 to rotate. Air entering the chamber is also forced to rotate with the turbine(s) before it can begin its passage down the interior of chamber 40 to exit via openings 62 in the wall of the tube 90. The rotation of the tube 90 will also help to keep air near the surface of the tube rotating in a similar manner, so that centrifugal forces will be active in heavier than air particles in the suction induced airflow through the chamber 40 as the latter migrates down the chamber.

This in turn assists in separating in the airstream, from the air, which latter changes direction near the bottom of the chamber to exit, virtually particle-free, through the openings 62. Separated particles continue to rotate around the chamber close to the wall thereof, until they are accelerated by the radially reducing regions of 64 and 38 where they progress through via the valve arrangement into the common bin 22, as previously described.

The arrangement of FIG. 9 differs from that of FIG. 8 by the inclusion of the helical baffle 88 which is attached to the rotatable tube 90 similarly to the manner in which it is attached to the stationary tube 58. However, as the tube 90 rotates the helical baffle will similarly rotate and perform somewhat like a screw-conveyor and continue to rotate as well as axially move the incoming air and particles through the chamber 40.

In practice the separation efficiency of the FIG. 9 embodiment is somewhat better than that of the FIG. 8 embodiment.

Although not shown a level-sensing switch such as 72, 74 can also be employed in the arrangements shown in FIG. 5, 6, 8 or 9.

FIG. 8 also demonstrates diagrammatically how the necked form of vortex tube such as shown in FIG. 2 may be used in place of the simple frusto-conical tube shown in FIG. 1, and it is to be understood that either form of tube may be employed in the second stage of any of the different embodiments shown in the drawings.

Figures 10, 10A:
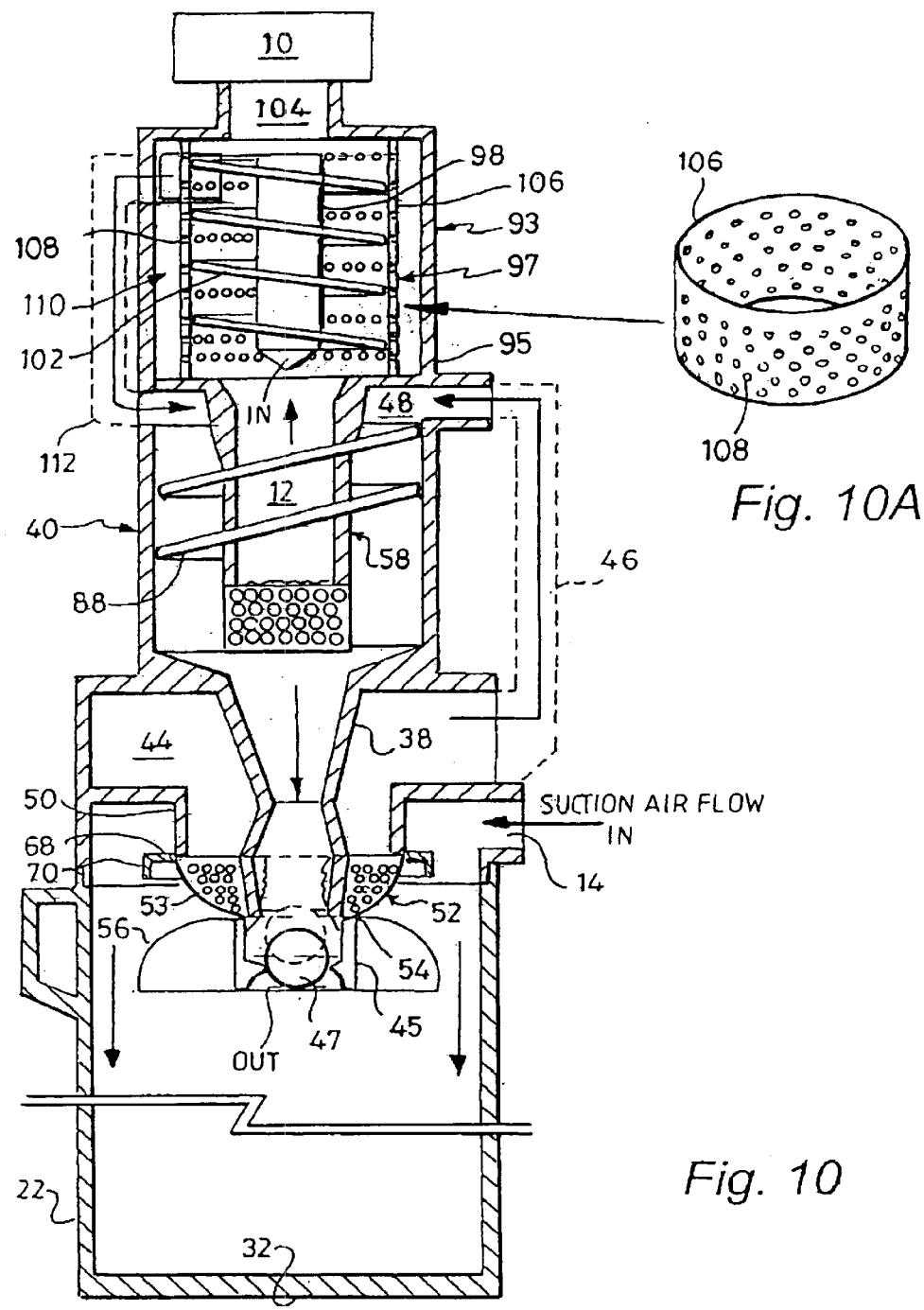
FIG. 10 is yet another embodiment of the invention.
FIG. 10A is a perspective view of the shroud of FIG. 10.

A further improvement in separation efficiency, but which does not involve rotating parts, is shown in FIG. 10. This embodiment incorporates a third separation stage in an extension 93 of the chamber 40. This arrangement is based on the arrangement shown in FIG. 7 in which the central hollow tube 58 extends axially of the chamber 40 and carries a helical baffle 88. The upper end of the chamber 40 is closed by a wall 95 from which the tube 58 extends, the wall being apertured to communicate with the interior of the tube 58, so that (as in FIG. 7) air entering 58 can pass axially up the interior 12 to enter the suction producing device 10.

In the FIG. 10 embodiment, the airflow leaving the upper end of the tube 58 now enters the chamber 97 (within the extension 93) and centrally of the chamber extends an elongate cylindrical member 98 the lower end of which is conically shaped at 100 with the apex of the cone pointing towards the incoming airflow from 58. The angle of the cone and the diameter of 98 are selected so as to cause the incoming air to be radially deflected so that any heavier than air particles in the airflow will tend to be displaced radially outwardly as well.

Around the member 98 is a helical baffle 102, which as shown is oppositely handed relative to the baffle 88.

The suction source 10 communicates with the upper end of chamber 96 via opening 104 so that air entering 97 from 58 in general has to pass up the helical path defined by the helical baffle 102, before it can exit via 104 to 10. In so doing, the rotation imparted to the ascending mass of air will cause heavier than air particles to migrate to the radially outer regions of the turns of the helix. The shroud is best seen in FIG. 10A.

Surrounding the helix is a cylindrical shroud 106 having a large number of small openings 108 through which air and particles can pass into the annular region 110 between the shroud 106 and the inside surface of the wall of the chamber 92.

A return path for particle bearing air from this annular space is provided via a passage 112 to exit tangentially into the upper region of the chamber 40 generally opposite the tangential entrance 48 by which particle bearing air from the first stage enters, the airflow from 112 entering the rotating air flow (created by the inflow through 48) in the same direction as it is rotating in 40.

Particles which pass through the holes 108 will tend not to return through them, so that once separated from the rotating airstream in the helix within the shroud, the particles will tend to migrate via passage 112 to mix with the particles at the top of 40, where they will tend to be separated by the action of the vortex established in 40 as previously described.

The central member 98 is secured to the helix 102, which in turn is secured within the shroud 106, which in turn is secured at opposite ends to the top and bottom of the extension 93.

Figures 11, 11A:
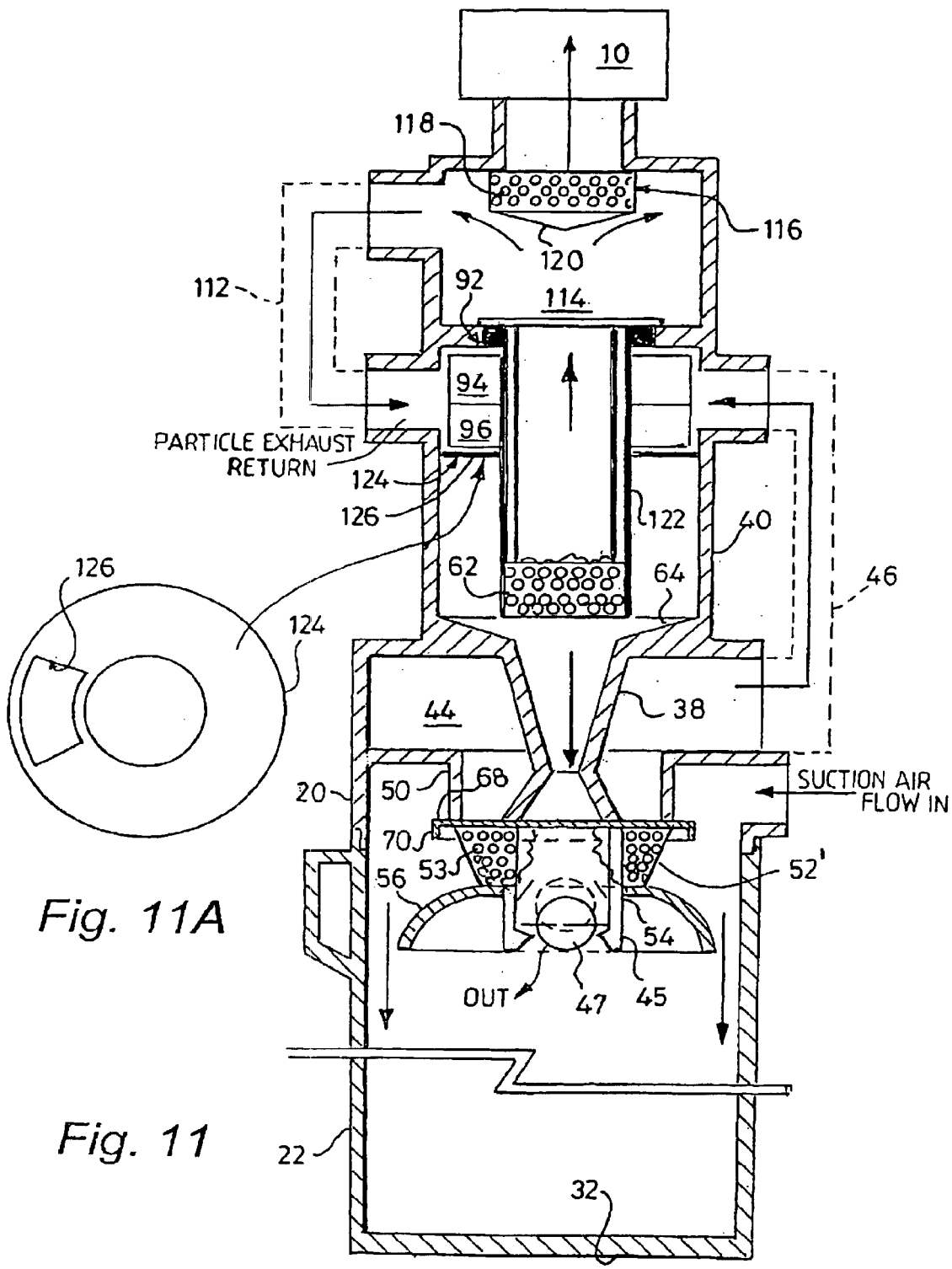
FIG. 11 shows one modification of the turban arrangement of FIGS. 8 and 9.
FIG. 11A is an underside illustration of the circular plate of FIG. 11.
Figure 12:
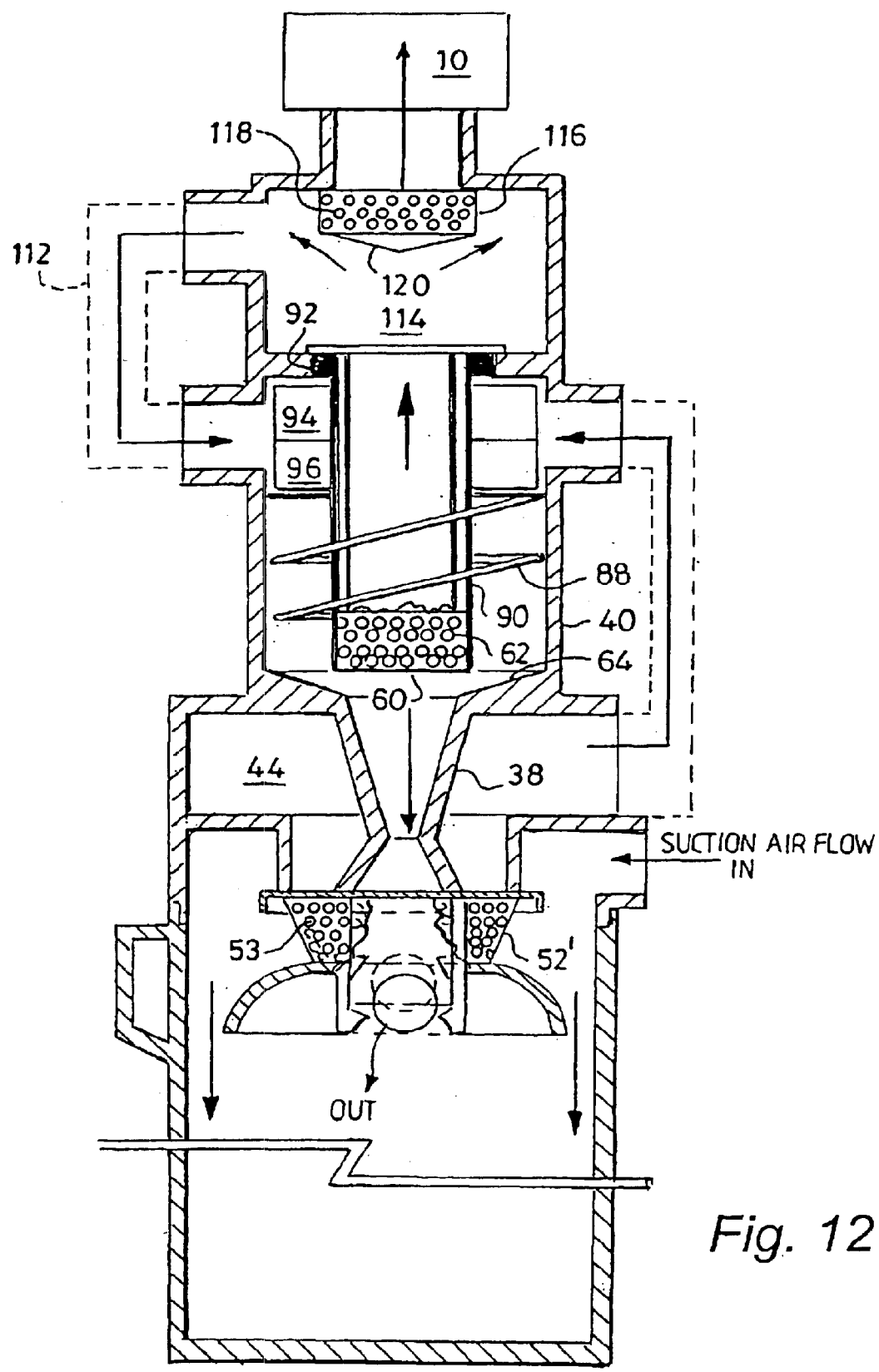
FIG. 12 is another modification of the turban arrangement of FIGS. 8 and 9.
Figures 13, 13A:
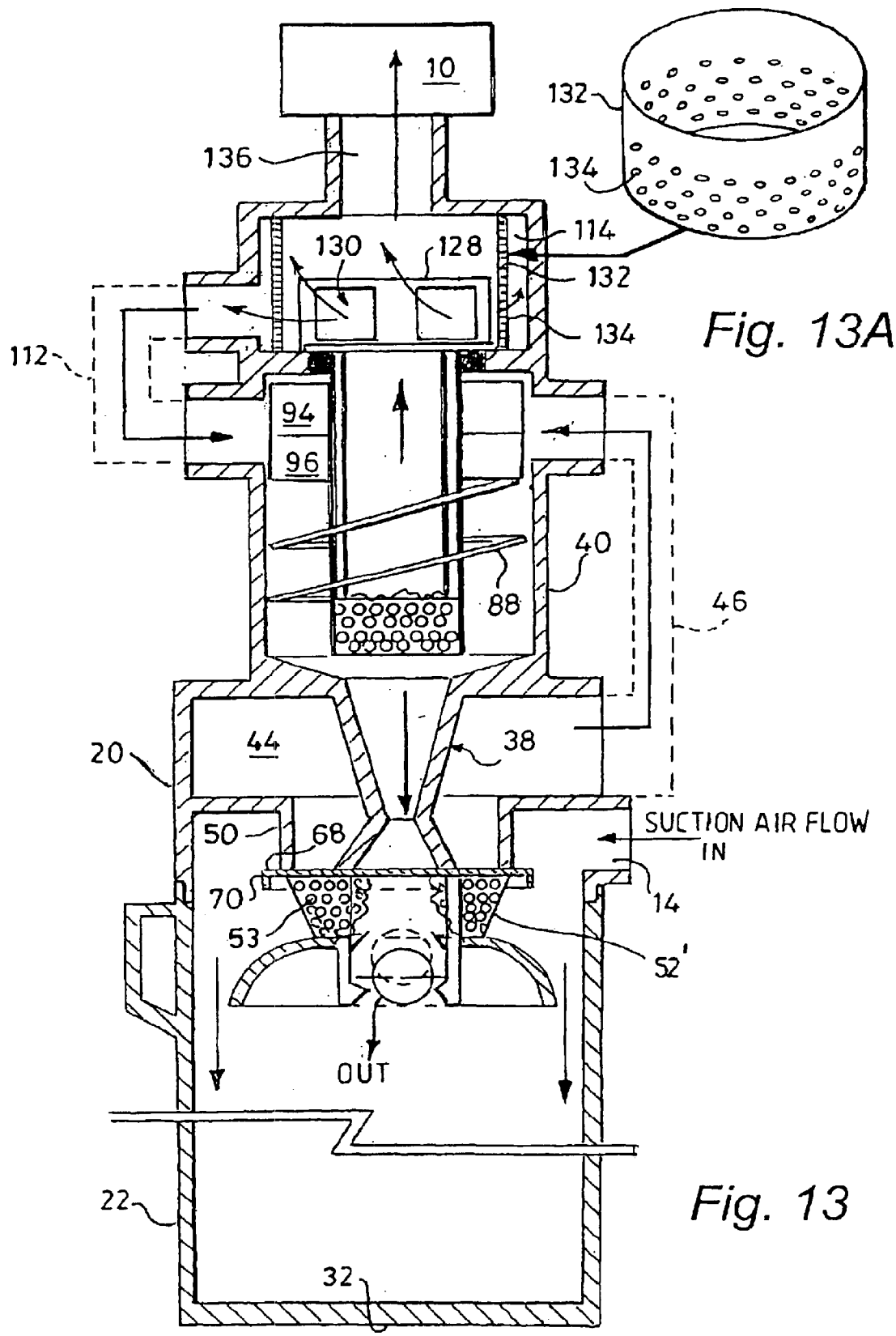
FIG. 13 is yet another modification of the turban arrangement of FIGS. 8 and 9.

FIGS. 11, 12 and 13 show how turbine arrangements of FIGS. 8 and 9 can be modified to supply air and any remaining particles to a third stage separation unit which may be similar to what is shown in FIG. 10, or may be a simple cavity 114 having a return path 112 as described in relation to FIG. 10 with a central hollow deflecting collector 116 comprising a cylindrical shell 118 having a large number of small openings in the wall thereof and a conical closed lower end 120 which acts in the same way s the conical lower end 100 of the central member 98 in FIG. 10.

In FIGS. 11–13 the perforated hemispherical shell 52 of the previous embodiments is now shown as a hollow frusto-conical shell 52' also formed with perforations 53 through which air and small particles can pass. In common with the hemispherical shell 52, the size of the open formed by the perforations in the shell wall is selected so as to generally impede particles greater than a given size, to prevent them from passing into region 44. The larger particles are collected in the bin 22 (in the case of a single bin arrangement such as FIG. 10) and in the outer region 26 of a 2 bin arrangement such as shown in FIG. 1.

The shell 52' is shown cut-away to reveal the lower end of 38 in the same way as the hemispherical shell 52 in the earlier figures.

As shown in FIG. 11, the lower part 122 of tubular member 58 may be separate from, so as not to rotate with, the upper end to which the turbine sections are attached, and may be supported in place by a circular plate 124 having an opening 126 therein (see the scrap plan view of FIG. 11A).

FIG. 13 shows how a radial and circular motion can be imparted to the airflow entering 114 by a hollow cap 128 attached to the upper end of the tube 58, so as to rotate therewith.

The wall of the cap is apertured by means of a plurality of windows, such as shown at 130. As the cap spins around its axis air leaves the windows with radial and rotational motion in the direction in which the cap spins.

A cylindrical shroud 132 which is stationary and ends from top to bottom of the chamber 114 includes a large number of openings such as 134 through which particles and air can pass. In order to pass to the suction source 10, the air has to reverse direction beyond the shroud and return via other of the openings 134, to allow it to pass via the central opening in the upper end of chamber 114 and through passage 136 to suction source 10. In so doing any heavier than air particles will tend to be left outside the shroud to be gathered up in the airflow returning to the second stage via passage 112.

The use of the rotating cap 128 obviates the need for the shell 118 of FIGS. 11 and 12.

In the case of the FIGS. 11, 12 and 13 embodiments, the passage 112 and the ports by which it communicates with 114 and 40 are typically 32 mm diameter, the angle of the cone 120 (where employed) is 160°, the diameter of the holes 62 are in the range 2–2.5 mm, the gap between closed end 60 and the frusto-conical surface 64 is in the range 3 mm to 18 mm, and will depend on the diameter of the chamber 40, which typically lies in the range 65–80 mm diameter. The gap referred to, and the necking of the tube 38 both resist back flow of the secondary vortex, and the diameter of the necked region is in the range 10 mm to 18 mm.

Although as shown in FIG. 13 the holes 134 (which equate to holes 108 in FIG. 10) are shown as extending only over the lower part of the shroud 132 (which equates to shroud 106 in FIG. 10), they may be (and preferably are) provided over most or all of the wall of the shroud as depicted in FIG. 10, so that any air which is sucked in an axial and radial sense, due to the suction at 136, will not tend to pass back through holes which register with the windows 130 in 128, but will tend to migrate inwardly through holes nearer the upper end of the shroud.

It is to be understood that the two-bin collector of FIG. 1 (with or without a valve or other device resisting mixing of particles in the inner bin with air in the descending or ascending vortex in 38) may be employed in conjunction with any of the second and/or third stage arrangements shown in FIGS. 2 to 13.

It is also to be understood that a particle level detector and switch such as shown in FIG. 2 may be employed in any of the arrangements shown in any of the Figs (including FIG. 1) for the purpose of at least alerting the user to the fact that the bin (or one of two bins) is full and needs to be emptied—if not also interrupting the power to the suction source.

It is also to be understood the single bin and valve arrangement of FIG. 2 may be employed with any of the second and/or third stage separators shown in any of the figures in the drawings.

The arrangements shown in the figures hitherto all relate to an upright vacuum powered air/particle separator, such as an upright vacuum cleaner. To reduce the overall height of such a device one or more of the $2^{nd}$ and $3^{rd}$ stages may be angled relative to the first stage such as shown in FIGS. 14 to 17. In all other regards they operate in just the same way as if the stages were mounted vertically one above the other. The opportunity has been taken to illustrate further variations on the make up of the second and third stages previously shown in earlier figures.

Figure 14:
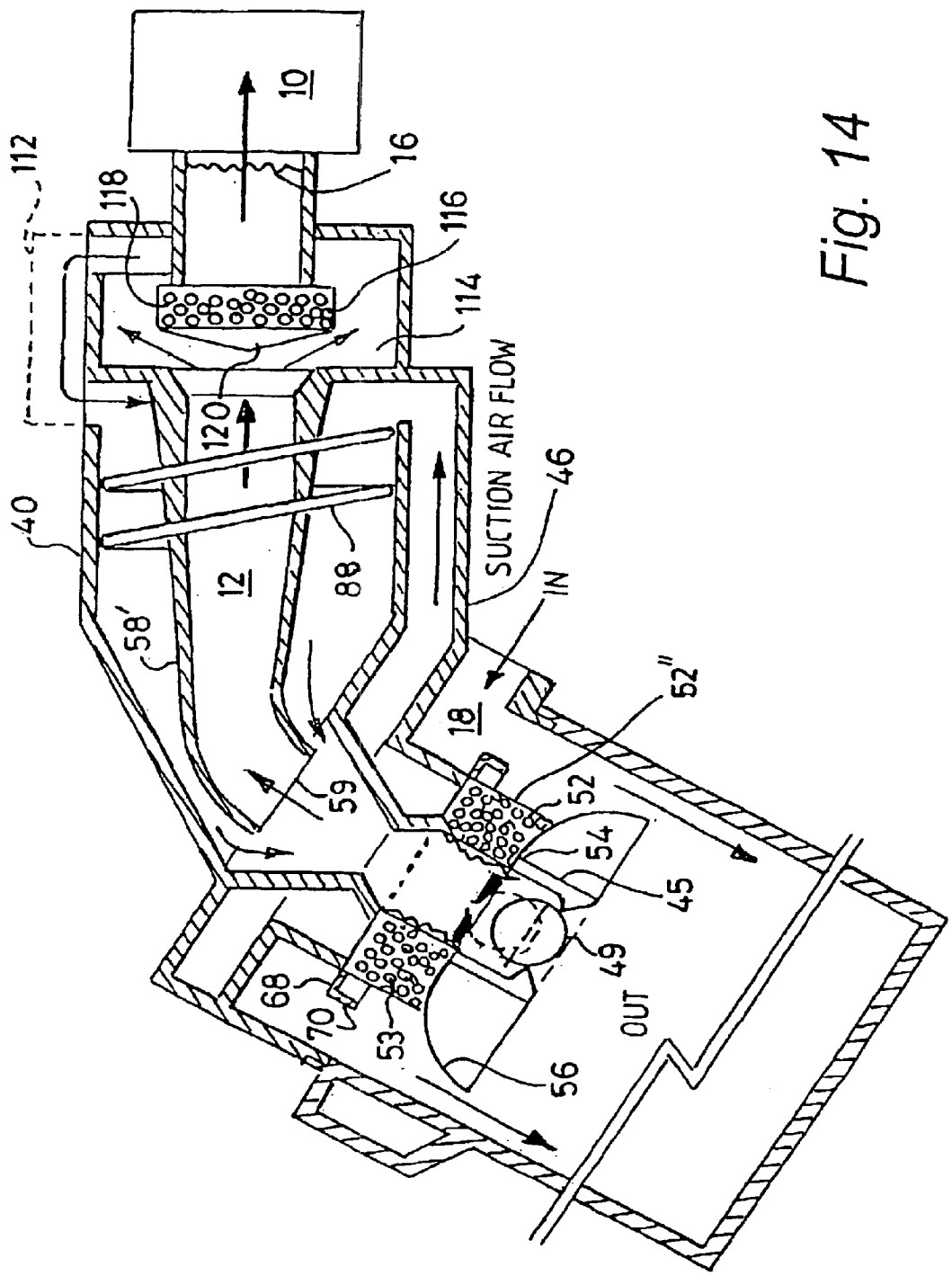
FIG. 14 is another modification of the embodiment of FIG. 10

FIG. 14 corresponds to the FIG. 2 arrangement, as modified by FIG. 2A, in which the end of the vortex tube 58 is bent around so as to enter open end of the frusto-conical region 38.

Figure 15:
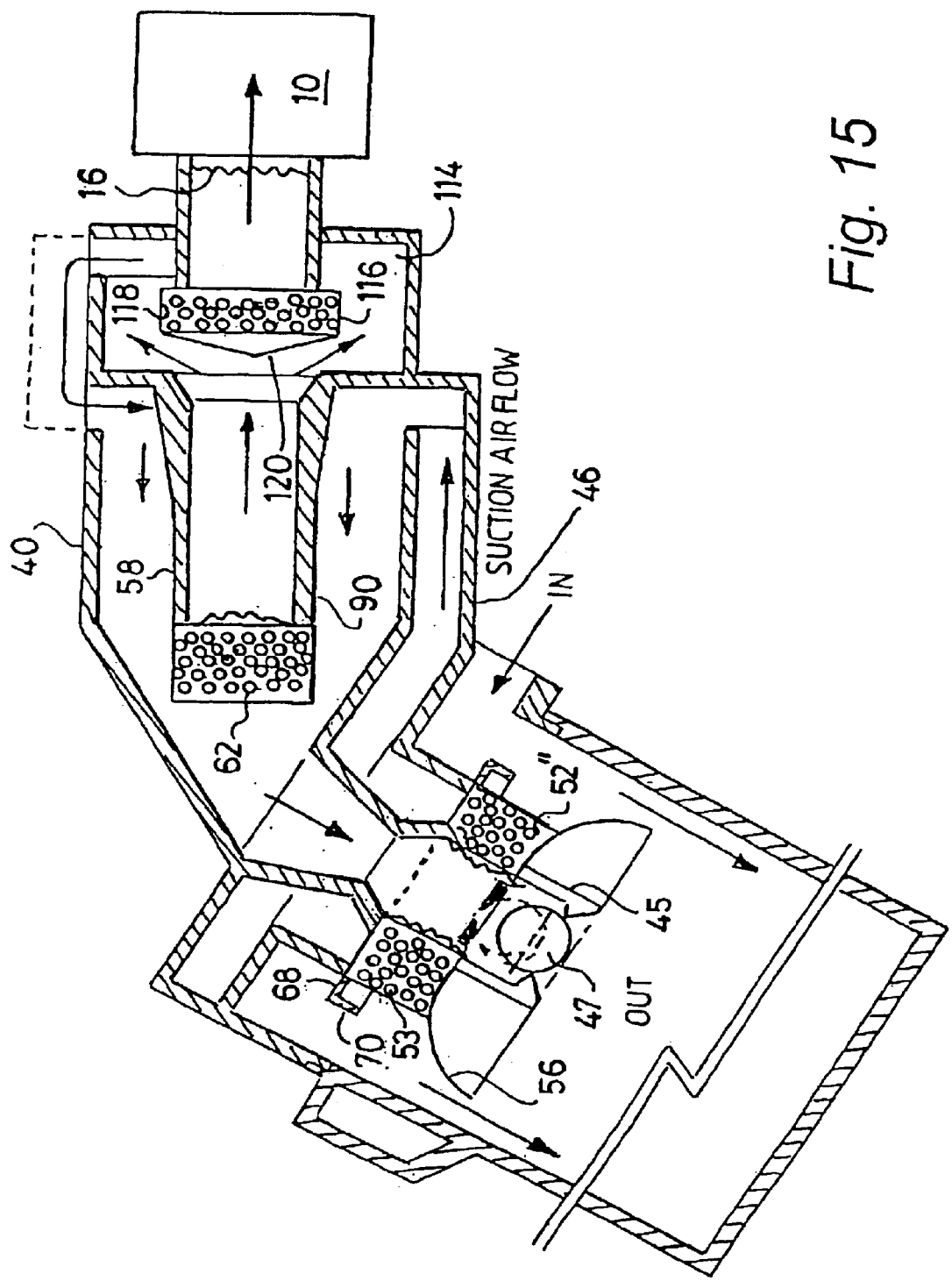
FIG. 15 illustrates another embodiment.
Figure 16:
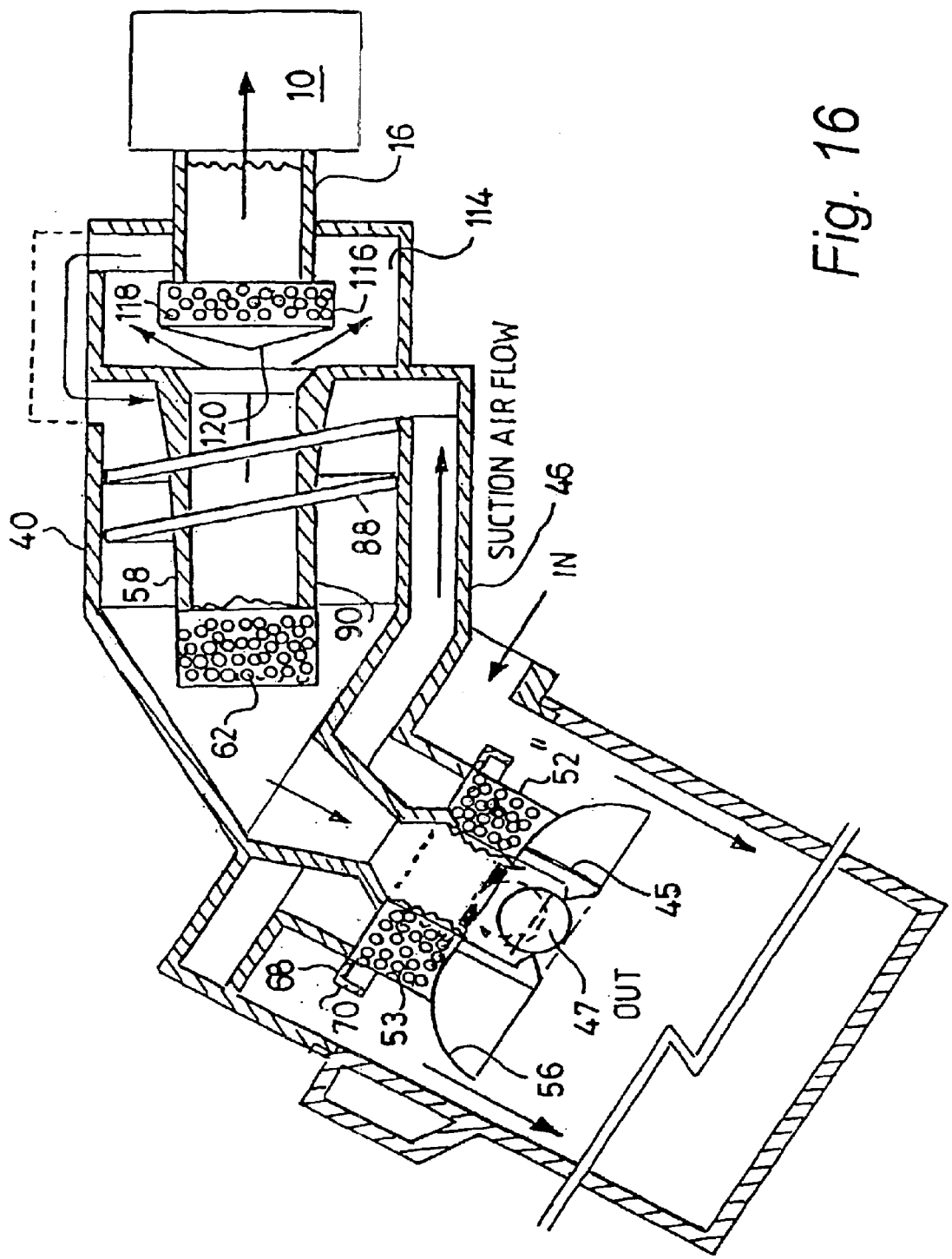
FIG. 16 illustrates a modification of the embodiment of FIG. 12.

FIG. 15 corresponds to FIG. 11 in so far as air and particles remaining near the wall of the third chamber will tend to return via a path 112 due to the depression at the other end of path 112 caused by the rotating mass of air in the second stage. However FIG. 15 shows that the turbine of FIG. 11 may be omitted. FIG. 16 corresponds to FIG. 12 in that a helix is provided in the second stage (albeit stationary) and no turbine is provided in the second stage.

In FIGS. 14 to 16 the perforated shell 52" is shown of cylindrical configuration as distinct from the hemispherical and frusto-conical configurations in earlier figures.

Figure 17:
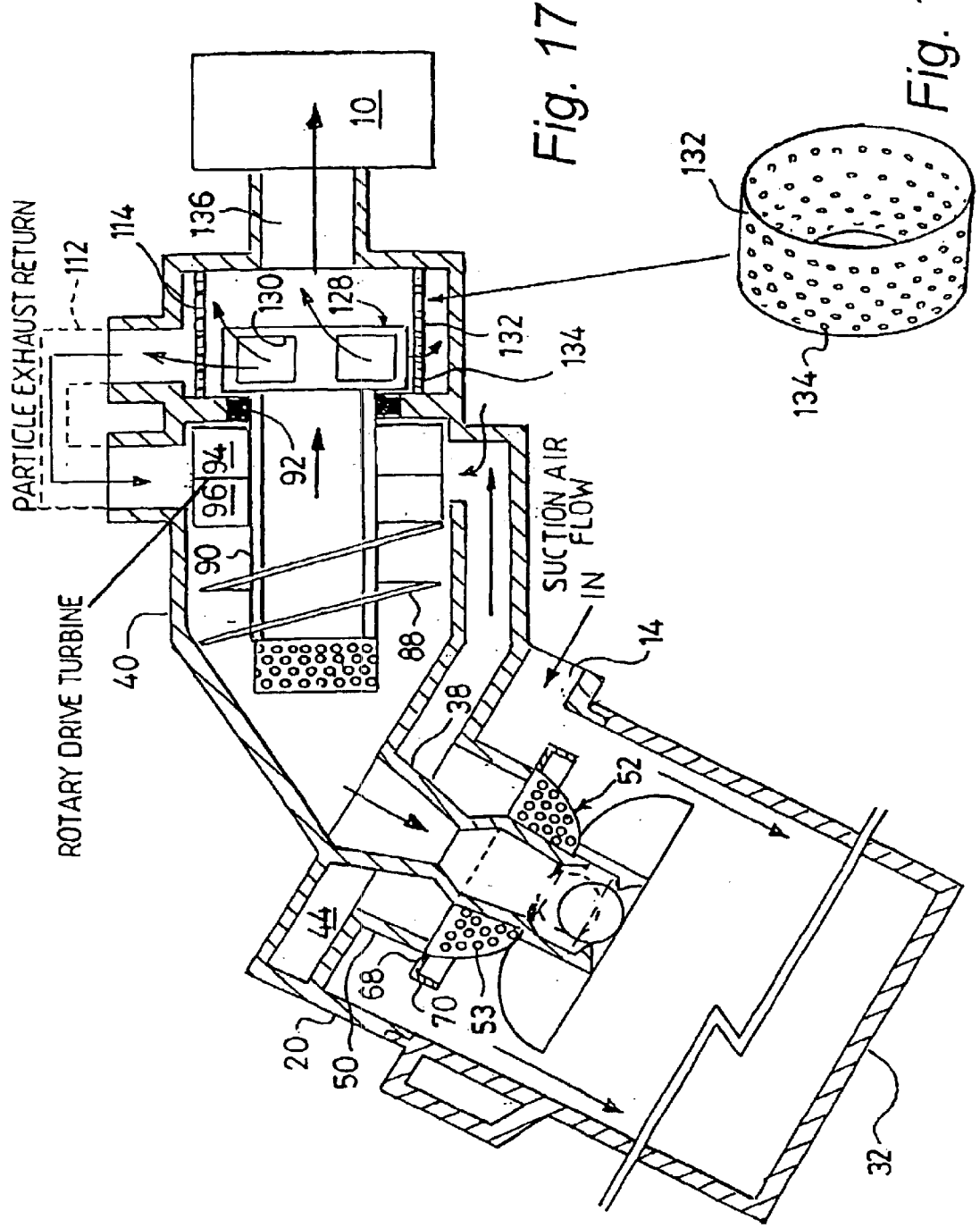
FIG. 17 is a view corresponding to the embodiment of FIG. 13.

FIGS. 17 and 17A correspond to FIGS. 13 and 13A.

Although the valve shown in each of FIGS. 2 and 6 to 17 is a ball valve, it may be replaced by the valve shown in FIGS. 3 and 4, and this may be to advantage in the case of embodiments such as shown in FIGS. 14–17 in that the movement of the valve closure member may no longer be 100% vertical and a spring which is compressed when the valve is closed, to assist in opening the valve when airflow ceases, may be desirable.

It is of course to be understood that a spring may be incorporated in the ball valve design (although not shown) to make the opening of such a valve more positive, whether in a vertically arranged apparatus or in a non-vertical arrangement as shown in FIGS. 14 to 17.

In FIGS. 14 to 17 the reference numerals identify items in common with earlier figures.

FIG. 18 illustrates another embodiment of cyclone vacuum cleaner (separator) of the type to which the present invention can be applied.

As shown in FIG. 18, the device comprises a suction inlet 210 which can be connected to a hose and dust collecting wand, or to a rotating brush assembly such as is located in the base of a domestic or industrial upright vacuum cleaner.

The suction inlet enters tangentially a cylindrical enclosure generally designated 212 and the upper end of a dust and dirt collecting drum 214. The lower part 214 is typically a push-bit at 216 to the upper region 212 and includes a handle 218. When full, the drum 214 is detached from the upper end 212, and emptied. The push-fit must provide a good sealing joint between 212 and 214 or a separate ring seal must be included.

The tangential entrance of the air stream causes the incoming air to circulate around the interior of the cylindrical region 212 and because of the higher mass of dust particles relative to air particles, the dust and dirt entrained in the air stream tends to migrate to the outer ends of the rotating air stream and fall into the drum 214 whilst relatively dust free air tends to spiral inwardly to evenly pass through the plurality of openings such as 220 in the hemispherical dish generally designated 222 located axially centrally of the cylindrical region 212.

After passing through the holes 220, the air rises into the upper cylindrical cavity 224 from which it exits via port 226 and is conveyed to the inlet port 228 at the upper end of a conical chamber 230 in which the second stage of separation occurs.

The upper end 232 of the conical housing 230 is itself cylindrical and the entrance 228 communicates tangentially with that cylindrical region in the same way as inlet 210 communicates with the cylindrical region 212.

It will be appreciated that as the height of dust and particles in the drum 214 begins to rise, there could be a tendency for the rotating air stream in the region 212 to draw dust and particles from the heap in the bottom of drum 214, back into the air stream from which they have been separated by the centrifugal force in the upper cylindrical region 212. To reduce this tendency, a hemispherical baffle 234 is provided so that only a narrow annular region 236 exists through which the particles and dust can fall from the rotating air stream in the region 212, into the drum 214. The baffle 234 serves to separate the rotating air steam in the region 212 from the dust and particle content of the drum 214, and reduces the risk of the dust and particles in 14 becoming entrained in the rotating air stream in 212.

The hemispherical surface 222 merges into the oppositely curved hemispherical surface of the baffle 234 where they are both joined to the lower end of the conical housing 230.

The latter therefore provides the central support for the baffle 234 and for the hemispherical surface 222 containing the exit apertures 220.

It will be appreciated that the presence of the lower end of the conical housing 230 penetrates and therefore renders incomplete, the two hemispherical surfaces 222 and 234.

Within the upper cylindrical region 232 is located a turbine shown designated 238 carried by a central hollow axle 240, the lower end of which is formed with a frusto-conical surface 242 which serves as a cyclone starter for the conical chamber 230.

Air entering the cylindrical region 232 via port 228 causes the turbine to rotate and the rotating air stream set up by the tangential entrance of port 228 into the cylindrical region 232 causes a downwardly spiralling cyclone in manner known per se. Dust and particles entrained in the spiralling air stream tend to be deposited at the lower end of the conical chamber 230 where they pass through a circular opening 244 into a secondary collecting bin 246 after first circulating around a helical baffle 248 at the upper end of the secondary bin 246.

The latter is also conical in configuration and is complementary to the conical housing 230. The interior of the conical secondary bin 250 serves to collect dust and particles separated by the cyclone established in the conical chamber 230 but it will be seen that the wall of the secondary bin 246 separates the interior 250 from the annular region 252 within which the separated dust and particle content from the primary air stream bin 212, are collected.

The centre of the helix 48 presents a flat circular end 254 a short distance below the cylindrical passage 244 leading from the end of the conical chamber 230, and typically the diameter of 244 is of the order of 10 mm and the distance between the open end of 244 and the plate 254 is of the order of a few millimetres. The downwardly ascending spiral of air within 230, reverses near the lower end 230 to form an upward spiralling central cyclone (not shown) which moves in the general direction of the arrow 256 to pass into and through the hollow interior 258 of the axle 240, and to enter a cylindrical region above the cylindrical region 232 housing the turbine 238. The passage from 258 into 260 is through windows such as 262 in a frusto-conical shaped spinner 263 which is mounted on the axle 240 so as to rotate with the turbine 238. Upper and lower walls of the spinner 264 and 266 respectively are closed, so that air passing into the central region of the spinner 263 can only exit through the windows such as 262. Radially extending flanges such as 265 located between the windows, impart rotation to the exiting air stream as it enters cylindrical region 260, and the air spirals upwardly through the chamber 260 further assisted by a rotating helix 268 mounted on a second horizontal axle 270 which rotates with the spinner 263.

Air from 258 cannot pass axially into the interior 278 of the second hollow axle 270, but has to pass through the windows 262 and after circulating around chamber 260, can either pass into the interior 278 of the upper axle 270 via holes such as 280 in the wall of the upper axle or can leave the chamber 260 via exit 282 to re-enter the air stream below the spinner 263 via an inlet port 284 located in the cylindrical region 232 at the upper end of the conical cyclone chamber 230. The port 284, like entrance port 228, merges with the cylindrical region 232 in a tangential sense so that incoming air from 282 will circulate around the cylindrical region 232 and further assist in rotating the turbine 238 and will merge with the incoming air stream via 228, to traverse the conical chamber 230 once again before proceeding up the centre of 230 as previously described and enter the region 258.

Because of the way in which air is collected from the upper chamber 260 via the port 282, any air leaving via port 282 will preferentially include any dust or heavier than air particles relative to that near the centre of chamber 260 and therefore the return path to 284 will tend to include dust and particles which have not been separated by the final separation stage in the region 260, whereas air entering the region 278 via the holes 280 will tend to be free of dust and particles.

Although not shown in detail, 278 communicates with a suction device 279 such as a fan or turbine driven by an electric motor or the like, the action of which is to draw air in the direction of the arrow 274 from the apparatus shown in the rest of the drawing. It is this suction effect created by the rotating fan or turbine (not shown) which establishes the incoming air stream at 210 and the general flow of air through the apparatus as previously described.

It has been found that apparatus such as shown in FIG. 18 can operate at a very high efficiency of separation so that very little dust and particle content is left in the air flow leaving 278, and it has been found possible to dispense with the filter which is normally located at such a position in the vacuum cleaning apparatus just prior to the vacuum inducing fan or turbine. The presence of any such filter substantially reduces the air flow and therefore suction effect created by the fan and/or turbine, and by not having to include such a filter, the air flow through the apparatus, and therefore the air speeds within the various rotating air streams and cyclone is increased, and the separation efficiency enhanced.

Since the hollow axle 270 rotates with the spinner 263, and it is not desirable for the wall 286 to rotate, a rotational seal 288 is red between the rotating portion 270 and the stationary portion 286. This may for example comprise complementary chamfered end surfaces between the two cylindrical walls with bearing material at 290 and 292 as shown in FIG. 18a.

Although described as a single turbine, 238 may be formed from two similar turbine blade assemblies each occupying half the axial length of the turbine 238 as shown, and each secured on the axle 240 with the blades of one turbine staggered by half the pitch f the blades of the other turbine so as to effectively double the number of blades of the turbine and therefore increase its efficiency.

Figure 18B:
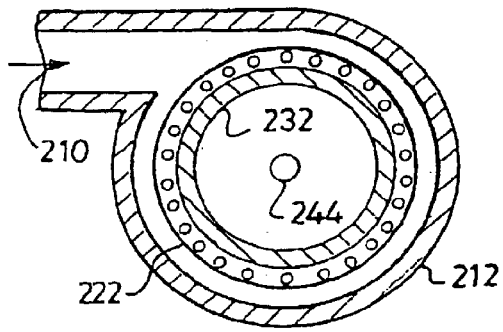
FIG. 18B is a cross-sectional view through the cylindrical region of FIG. 18.

FIG. 18b is a cross-section view through the cylindrical region 212 of FIG. 18, and shows the tangential inlet 210 and the cylindrical form of the wall of the conical chamber 230 where it is sectioned, the small orifice 244 at the lower end of the chamber 230, and the intermediate cylindrical outline of the wall 232 where the hemispherical surface 222 is cut by the cross-section.

Figure 18E:
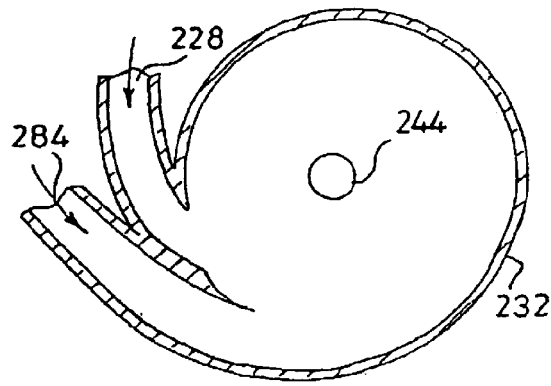
FIG. 18E is a cross-sectional view similar to FIG. 10D.
Figure 18C:
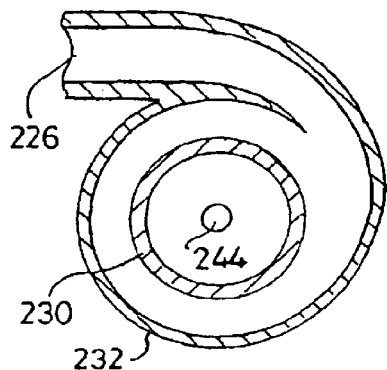
FIG. 18C is a cross-sectional view along lines C—C of FIG. 18.

FIG. 18c is a cross-section through CC in FIG. 18, and shows how the exit port 226 communicates with the cylindrical region 224 and further assists in keeping the air mass rotating as it exits into the region 224 by virtue of the tangential exit 226 therefrom.

Figure 18F:
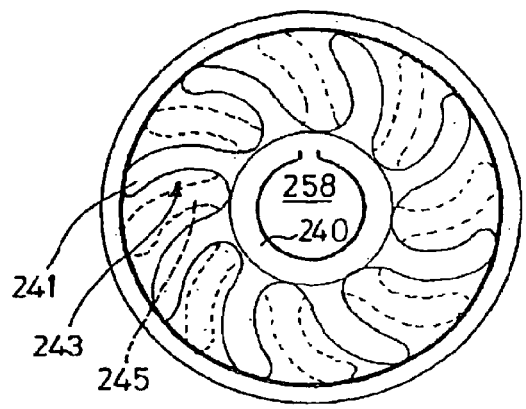
FIG. 18F illustrates the turban blades not shown in FIGS. 18D and 18E.
Figure 18D:
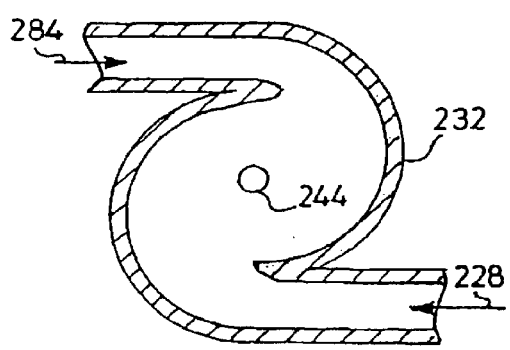
FIG. 18D is a cross-sectional view along lines D—D of FIG. 18.

FIG. 18d is a cross-section on DD in FIG. 18, and shows one arrangement of inlet port 228 and return port 284 in the region of the turbine 238.

FIG. 18e is similar to FIG. 18d, but shows alternate positions for ports 228 and 284 if desired.

The important criterion is that rotating air mass in 232 set up as air enters at 228 will tend to swirl past port 284 and continue in this circular motion around 232, rather than enter 284. In the same way, air re-introduced into 232 via 284 will likewise be swept into the rotating airstream induced by air entering by 228, and there will be no tendency for the air to enter the port 28 during its rotational movement within 232.

For clarity, the turbine blades are not shown in FIGS. 18d and 18e, but instead the turbine is shown in FIG. 18f. This shows hollow axle 240, central region 258 and eight curved turbine blade of which one is designated 241. As shown in FIG. 18f, the turbine is viewed from above, since it will be appreciated that air entering region 232 should be directed against the surface 243 of the blade 241 (and the corresponding surface of each of the other blades) to induce rotation of the turbine.

Where two turbines are mounted on the axle 240, each is of the same configuration as shown in FIG. 18f, but of half the axial depth of 238, so that the two will fit within the same axial space, and are mounted so that when viewed axially, the blades of one turbine will be seen to occupy the spaces between the blades of the other. The blades of the second turbine if fitted, are shown in dotted outline in FIG. 18f, and one of these is denoted by reference numeral 245.

Figure 18G:
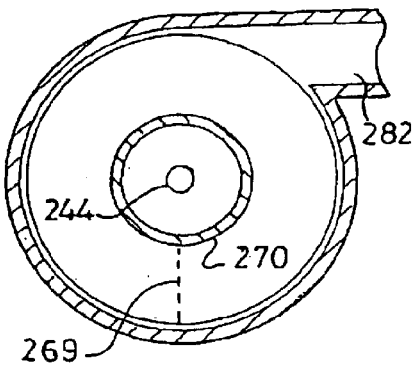
FIG. 18G is a cross-sectional illustration taken along lines G—G of FIG. 18.

FIG. 18g is a cross-section through FIG. 18 on line GG and shows the exit port 282 communicating tangentially with the cylindrical interior 260 and the cylindrical wall 270 of the hollow axle on which the helix 268 is mounted, the upper end of which is shown at 269.

It will be appreciated that the helix is a relatively close fit within the cylindrical housing defining the chamber 260.

Although not shown in the drawing, it has been found advantageous for the openings 280 in the wall 270 to start a short distance after the beginning of the helix at the lower end 270 and to terminate a short distance prior to the end of the last turn of the helix at the upper end of 270.

Typically the apertures 280 are circular and have a diameter of 1.7 mm and approximately 1200 such holes are formed in the wall 270.

Typically the helix has an angle in the range 2 to 10°, typically 4°.

Figure 19:
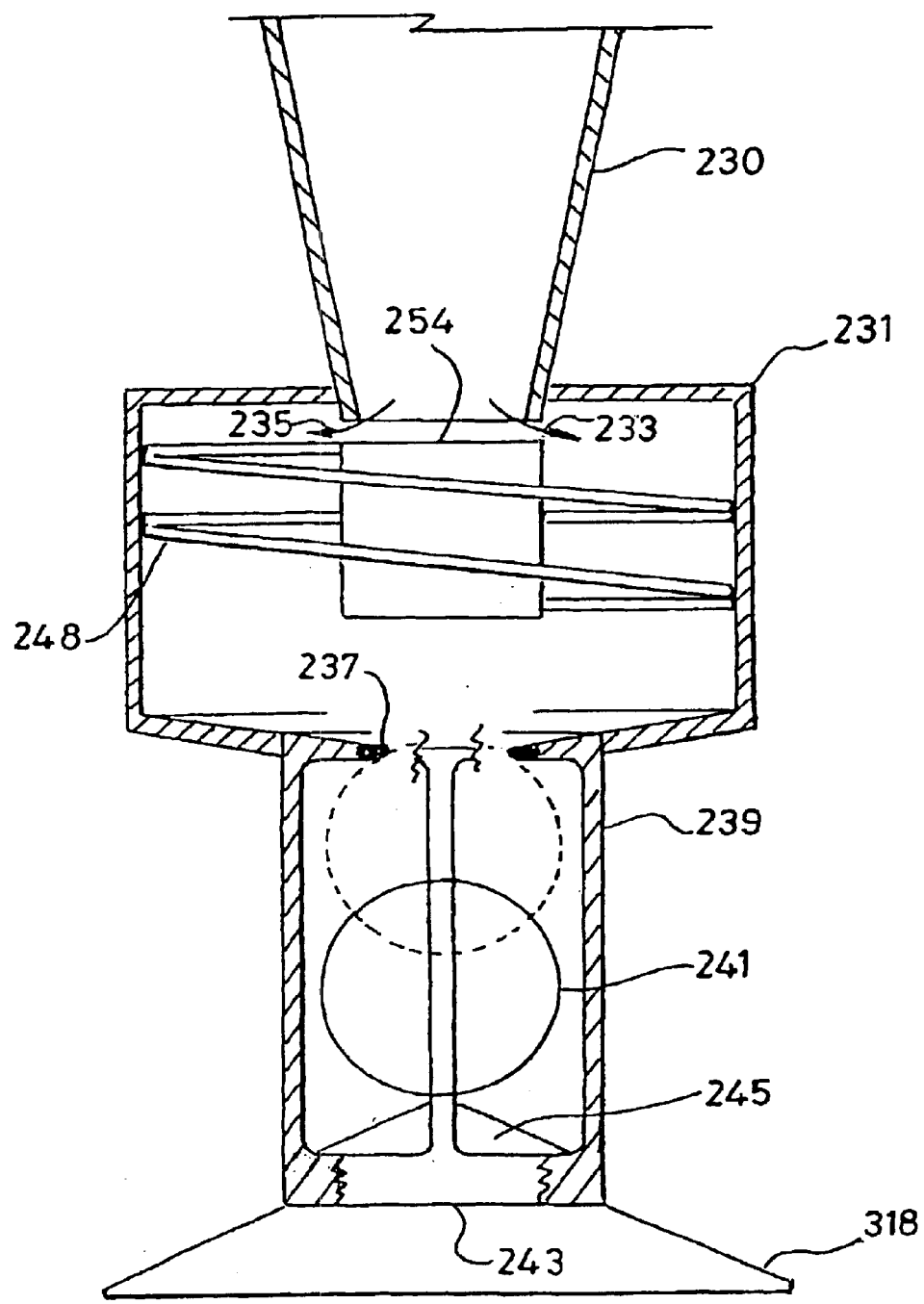
FIG. 19 shows a modification of the lower end of the conical cyclone separation tube.

FIG. 19 shows a modification to the lower end of the conical cyclone separation tube 230. The lower end terminates in chamber 231 instead of the cylindrical nozzle 244 of FIG. 18, and the housing 231 is located a helix corresponding to item 248 of FIG. 18.

The gap between the upper surface 254 of the central region of the helix 240 and the lower end of the conical tube 230 is selected so as to achieve the desired objectives, namely free ingress of dust and particles in the direction of the arrows 233 and 235 into the helix and thereafter into the lower region of the chamber 231, but minimal transfer of dust or particles in the reverse direction.

A cage 239 extends below the chamber 231 arranged symmetrically relative to the valve seat formed by the seal 237. Within the cage is a ball 241 which can cooperate with the valve seat seal 237 to close the opening into the chamber 231. The density of the ball is selected so that a rising air stream passing in an upward sense through the cage into the chamber 231 will cause the ball to lift and become a valve closure member as it seals against the lip seal 237.

The cage includes a base 243 the internal upper face of which is formed as a shallow pyramid at 245 to space the ball from the base of the cage when air flow is zero, and the ball can fall under gravity to leave the opening defined by the valve seat seal 237, open.

When the FIG. 18 apparatus is modified as shown in FIG. 19, the secondary bin 246 can be dispensed with. The whole of the drum 214 is now available for storing any dust and particles collected by the separation process whether in the primary separation stage in the cylindrical region 212 or in the secondary stage caused by the reverse cyclone effect within the conical housing 230.

The FIG. 19 arrangement enables this since as soon as air flow is established in the apparatus, some of the air entering at 210 will divert into the lower part of the drum 214 and rise up through the cage 239, the opening defined by the valve seat 237, through the helix 248 and into the conical housing 230. However air flow will lift the ball 241 into engagement with the seal 237 (as shown in dotted outline) to close the opening at the lower end of the chamber 231 and thereafter the apparatus will operate substantially as described with reference to FIG. 18. The chief difference is that particles and dust separated by the cyclone effect in the conical housing 230 will now leave in the direction of the arrows 233 and 235 and after traversing the helix 248 remain in the small chamber 231. When the air flow ceases as at the end of a cleaning session, the ball 241 immediately drops to its lower position from the one shown in dotted outline in FIG. 19, and any dust and dirt particles in the chamber 231 will fall through the opening around the ball, and out through the openings in the cage 239, to join the rest of the dust, dirt particles collected within the main drum 214. The lower end of cage 239 is closed by a frusto-conical housing 318.

Whenever the apparatus is powered up again, air flow is once again established, and the process is repeated, with the initial closing of the opening by the engagement of the ball 241 with the seal 237, and the collection of dust and dirt particles in chamber 231. When the apparatus is again powered down, dust and dirt particles collected in 231 will again leave the chamber via the now open valve seating and join the rest of the dust and dirt particles in the main drum 214.

The ball 241 and seal 237 therefore represent a one-way valve which, in combination with the helix 248, prevents dust and dirt particles from entering the lower end of the conical housing 230 when air flow is established. This effectively creates a secondary bin for the dust and particles collected from the secondary separation which occurs in the conical housing 230, until it is opportune to mix the dirt particles and dust collected herein with those in the remainder of the drum 214.

Figure 20:
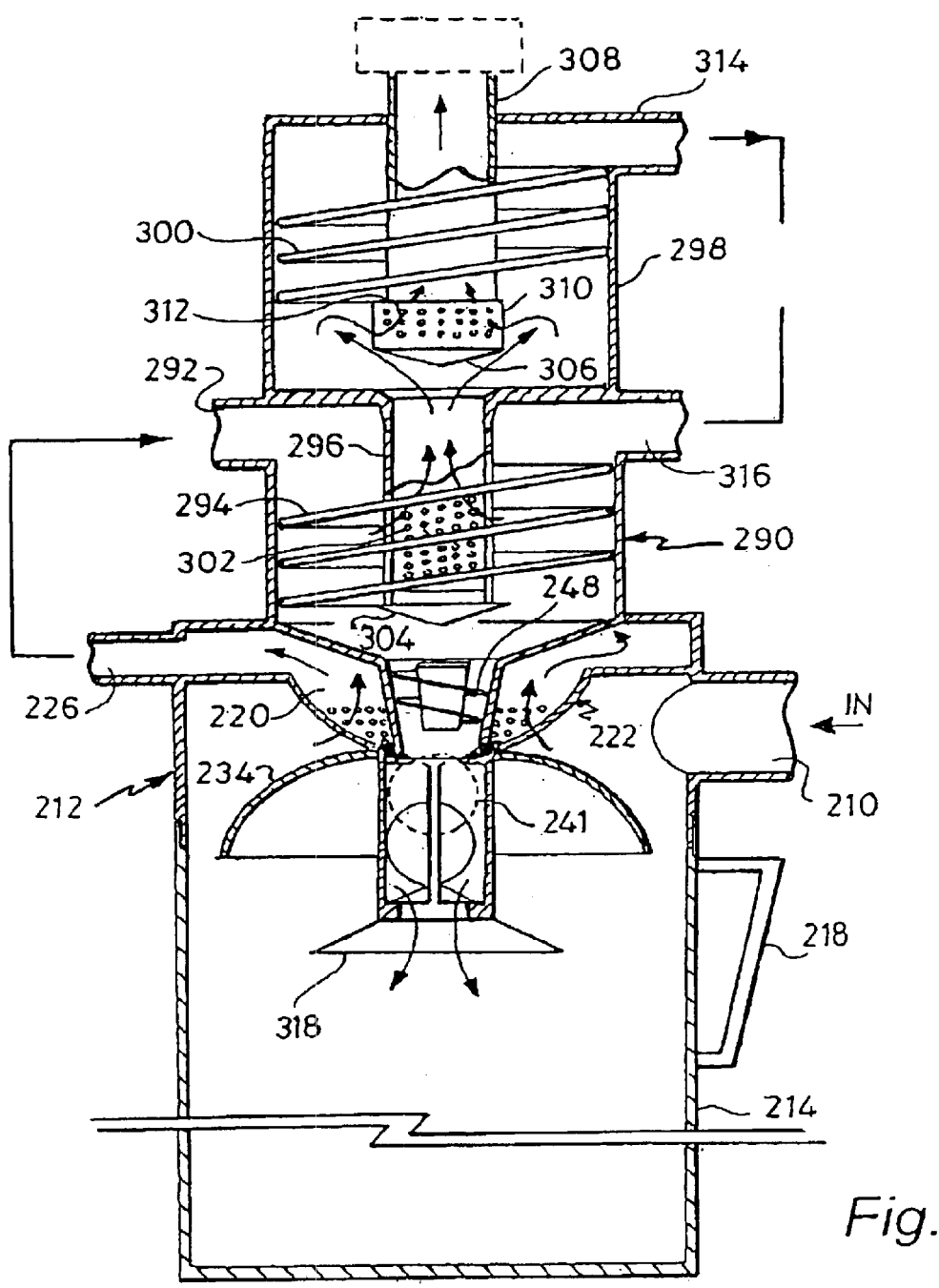
FIG. 20 is a cross-sectional elevational view of another form of cyclone separation apparatus according to the invention.

FIG. 20 illustrates an alternative cyclone separation apparatus also incorporating the features associated with the primary separation stage and dust collecting bin 214. Thus dust laden air entering at 210 is as before, caused to move in a circular path within region 212. Dust particles tend to fall towards the bottom of the bin 214 and air with substantially less dust particles contained within it passes through the small holes 220 and into the manifold region thereabove to exit via 226.

In the arrangement shown in FIG. 20, the now dust depleted air flow passes into the upper end of an intermediate chamber 290 via inlet port 292. As with inlet port 220, inlet port 292 is tangential to the generally circular cross-section of the chamber 290 and as before, the incoming air is caused to follow a rotational path which since there is no exit in the upper region of the chamber 290, begins to travel down a helical path defined by a helix 294 which is a close fit within the chamber 290, around the central hollow stem 296.

Air flow out of the chamber 290 is via a large number of very small holes formed in the wall of the hollow stem 296. The latter communicates with an upper chamber 298 within which is located another helix 300 the purpose of which will be described later.

One of the holes in the wall of the stem 296 is denoted by reference numeral 302. It has been found advantageous that the holes begin a short distance (measured around the stem) after the helix has started 296, and terminate a short distance (measured around the stem) before the helix finishes.

In one arrangement, a circumferential length of approximately 15 mm of unperforated stem wall exists at one end of the helix and approximately 40 mm measured circumferentially of unperforated stem wall exists at the other end of the helix, in each case the circumferential length being measured from the adjacent end of the helix around the stem.

Below the last turn of the helix, the stem 296 extends downwardly in the lower regions of the chamber 290 and terminates in a conical closure 304 which may also be apertured.

The rapidly moving dust particles will tend to fly out to the outer circumferential regions of the helix and continue down into the lower regions of the chamber 290. Thereafter they will pass down through the helix 48 and collect in the lower region of the small collection chamber above the non-return valve formed by the ball 241, and will be released into the collecting bin 214 at the end of the vacuuming session as described in relation to FIG. 19.

The air which passes through the small holes 302 and rises through the hollow interior of the stem 296 will be further depleted in terms of dust and dirt particles and will rise into the upper chamber 298 and be deflected by the downwardly extending conical end 306 at the lower end of the cynical tube 308 the upper end f which communicates with the source of the vacuum (not shown), such as a motorised fan or turbine.

Intermediate its ends, a helix 300 extends around the tube 308 and is a close fit within the cylindrical housing 298 in a similar way that the helix 294 occupies chamber 290. However no apertures are formed in the wall of the tube within the turns of the helix. Instead a region 310 of the tube between the lower end of the helix and the downwardly facing conical closure 306 is formed with a perforated wall containing a large number of small apertures, one of which is denoted by reference 312.

Air entering the chamber 298 will in part pass through the holes 312 and rise upwardly through the tube 308. The air which does circulate will tend to be that which is in the central region of the air stream which has not been significantly deflected by the effect of the downwardly deflecting cone 306. The effect of the cone has been found to induce a further degree of separation in that particle laden air will tend to carry on in a straight line after being deflected by the cone and will tend to enter the helix 300 rather than change direction and enter the small holes 312 in the section 310. Once the particle laden air has entered the helix, it can only traverse the chamber 298 via the helix, and leave via exit 314 at the upper end of the chamber 298 from where it is returned to a second or return inlet 316 at the upper end of the intermediate chamber 290. There it entrains with the incoming air stream from inlet 292 and any dust particles remaining in the air stream will tend to be thrown out by the circular motion of the air as it progresses down the helix 294 once again for collection as described in the small chamber below the helix 248, leaving clean air to pass through the apertures 302.

Very high separation efficiencies have been achieved using apparatus such as shown in FIG. 20.

Figure 21:
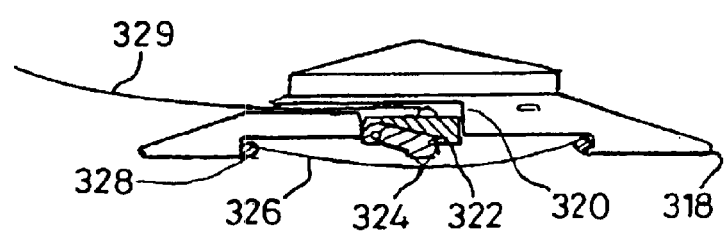
FIG. 21 shows a level sensing device for the lower end of the cage of FIGS. 19 and 20.

The lower end of the cage 239 shown in FIG. 19 and in FIG. 20, incorporates a level sensing device such as shown in FIG. 21. As shown in FIGS. 19 and 20, the lower end of the cage 239 comprises a shallow angle frusto-conical housing and this is shown in more detail in cross-section in FIG. 21.

The frusto-conical housing is denoted by 318 and is cut away at 320 to reveal that the interior of the frusto-conical housing 318 houses a microswitch 322 having an operating arm 324 which if depressed in an upward sense will change the state of the switch.

A flexible membrane-diaphragm 326 extends across an opening in the underside of the housing 318. The diaphragm is held in place by a circlip or other retaining device 328 and is designed to be such that if the height of the heap of dust and dirt particles in the bin 214 becomes such as to make contact with and press against the membrane-diaphragm 326, the switch will be operated and the contacts will be closed (or opened as the case may be).

An electrical connection such as 328 connects the switch contacts to a relay or contactor so that if the switch is operated, power is removed from the suction motor so that the apparatus ceases to function. A warning signal may be generated, either visibly or audibly to indicate to the user that the bin is now full and should be emptied before any further usage occurs.

Although not shown, signal warning means may be provided on the apparatus preferably of a visible nature to explain by way of a warning message or coded sign that the condition exists requiring the bin to be emptied. Typically this may comprise an LED display or a simple electromechanically moved vane which moves so as to display a differently coloured area of the vane in a window, eg a green region of the vane is now replaced by a red region indicating that the bin is full, once the microswitch is operated.

Although described in relation to the FIGS. 19 and 20 embodiment, a level sensing device may also be incorporated into either the inner or outer collector 250, 252 of FIG. 18. Where a warning si is generated, in association with the FIG. 18 arrangement, this conveniently indicates whether it is the inner or outer collecting bin which has become full.

Figure 22:
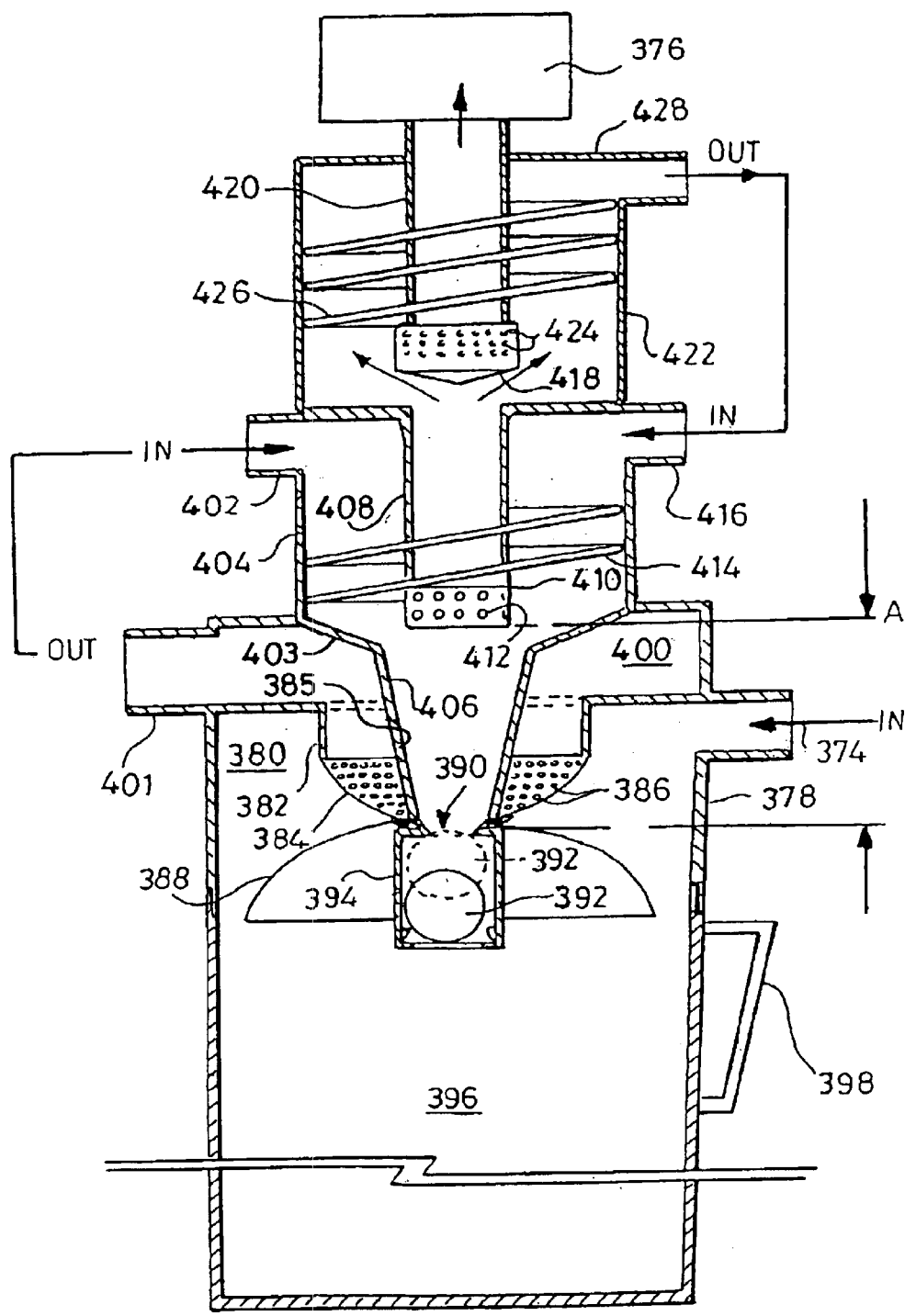
FIG. 22 is a cross-sectional elevational illustration of another form of separator according to the invention.

In the alternative separator shown in FIG. 22, particle laden air is sucked into inlet 374 once a vacuum is established by operating a motor-driven vacuum producing fan/turbine 376. The incoming airflow is generally tangential to the wall of the cylindrical housing 378 and is thereby caused to form a circulating air mass around the region 380, at the upper end of the housing. Centrally is located a cylindrical vortex inducer 382 which extends into a hemispherical shell 384 containing a large number of very small openings 386 through which air can pass.

Below the surface 384 is located a similar but oppositely convexly curved shroud 388, which extends almost to the internal wall of the housing 378. Centrally of 382 and 384 a frusto-conical tubular surface 385 extends in an axially downward manner to communicate with an opening 390 in the centre of the shroud 384. A lightweight ball 392 which will normally occupy the lower end of housing 394, will, under the effect of a rising airflow through the housing 394, rise to engage and close off the opening 390 as shown in dotted outline at 392'.

The rapid circulation of air around 380 will tend to separate particles in the airstream from the air by virtue of centrifugal forces, so that the particles will migrate to the wall of the housing 378 and fall under gravity, past the shroud 388, into the particle collating region 396 of the housing 378. The latter is in two parts, the upper part 380 and the lower part 396, and the latter has a handle 398 to assist in carrying it when full to be emptied.

The vacuum-source 376 inducing an airflow through 374, does so via the openings 386, so that the incoming airflow will eventually change direction and pass through the openings 386 and pass via the hollow interior of the shell 384 and vortex actuator 380 into a manifold 400 which has an exit at 401 from where the now largely particle-free air is conveyed via a pipe (not shown) to an inlet 402 of a further separation stage contained within a cylindrical housing 404 mounted coaxially above the housing 378 and manifold 400. The housing 404 includes a first downwardly extending frusto-conical axial extension 403 which leads to a second frusto-conical member 406. The interior of 404 communicates with the particle collecting bin 396 when the ball valve 390, 392 is open, and the frusto-conical member 406 provides the frusto-conical surface 385 previously referred to.

Centrally of the housing 404 is a downwardly extending tube 408 the lower end of which is capped at 410, the cylindrical wall of the cap being apertured at 412.

Above the cap 410 is a two-turn helical baffle 414 at the upper end of 404, circumferentially remote from 402 in a second inlet 416 to which particle-containing air from the third stage is returned.

Although a helical baffle has been shown as required above the ball valve in FIG. 20, it has been found that provided there is a sufficient distance between the underside of 410 and the opening 390 in FIG. 22, no helical baffle is required in the FIG. 22 arrangement.

The tube 408 serves as the air outlet from 404 and the air passing up through 408 is circularly deflected in all directions by a downwardly facing conical end 418 of a cylindrical closure of an axially extending tubular member 420 in a cylindrical housing 422. The cylindrical wall of the closure is apertured as at 424 to provide an exit from the interior of 422, to the suction source 376.

Particle-containing air from 408 tends to give up the particles as the air deflected in a radial sense on meeting the conical end face 418 abruptly changes direction and returns in a radial sense towards the openings in the cap 418 as it meets the interior of the housing 422. Particles will tend to be drawn into the lower end of a three turn helix 426 and after traversing the helix the particles leave the housing 422 via exit 428 to be returned via a pipe (not shown) to inlet 416 in chamber 404, to mix with the incoming particle laden air from 402, to be separated therefrom by once again travelling the helix 414 and the vortex travelling to and from the lower end of 406.

Substantially particle free air exits via the openings 424 through tube 420 to the suction source 376 and it is found that overall separation can be so effective that there is no need for any filter in the path trough 420 to the source 376.

Figure 23:
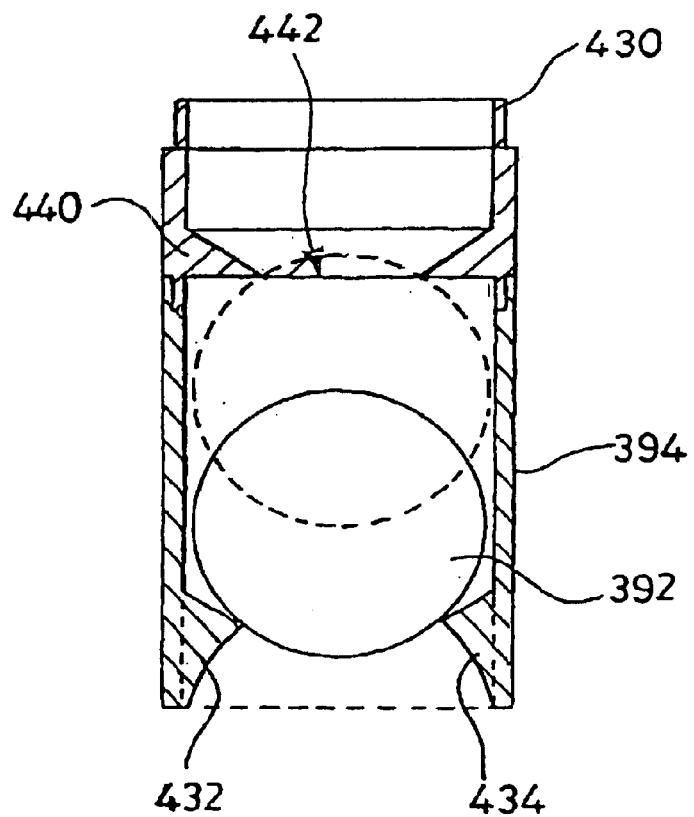
FIG. 23 is an enlarged cross-sectional illustration showing the ball within the cylindrical housing of FIG. 22
Figure 24:
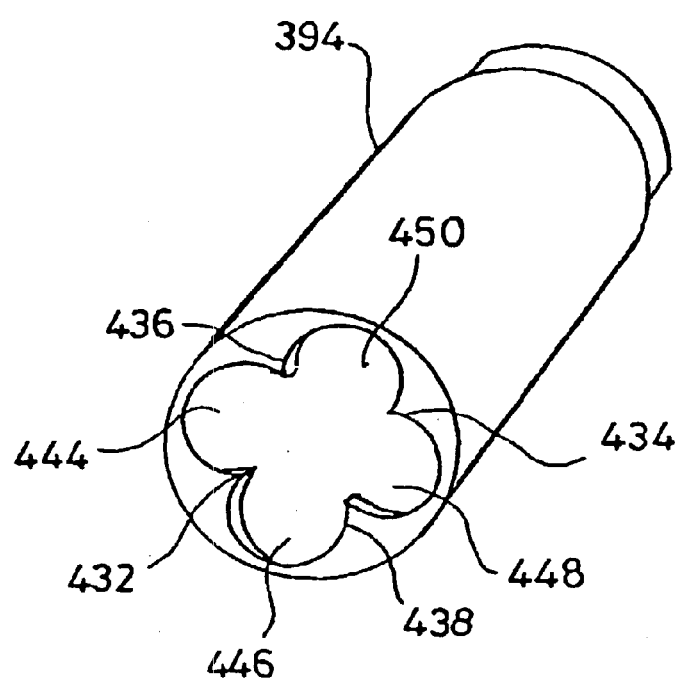
FIG. 24 is a bottom-perspective view of the cylindrical housing of FIG. 23.

As shown in FIG. 23, the ball is freely contained within a cylindrical housing 394 the upper end 430 of which is sealingly secured to the lower open end of the shroud 384 of FIG. 20. Radial protrusions 432, 434 prevent the ball from falling through the lower open end of the housing 394—and as shown in FIG. 24, four such radial protrusions are provided, 432, 434, 436 and 438. Near the open upper end of the housing 394 is an annular protrusion 440 which forms a valve seat which co-operates with the ball 392 to close off the passage of air through the opening 442 defined by the annular protrusions 240, when the ball is lifted (as by airflow in an upward sense) when vacuum is first applied to the system.

Where the diameter of the ball 392 is somewhat less than that of the interior of the housing 394, particles which collect above the ball 392 (when in its upper position shown at 392') can fall past the ball and out through the spaces such as 444, 446, 448 and 450, to exit the housing into the bin 396.

A level sensing device (not shown) may be incorporated into the design of separator shown in FIGS. 22 to 24.

The apparatus described herein may also be used for separating liquids (eg water) from gases (eg air) since in general liquids are more dense than gases. If solid particles are also preset of material having a density greater than the gaseous and liquid phases, these can also be separated from the gaseous phase along with the liquid phase, and in a second pass through the apparatus or by passage through a second similar apparatus, the solids can be separated from the liquid phase, provided the relative densities are sufficiently different.

In any situation where liquid is involved, a liquid trap or filter may be provided if the suction source would become contaminated or damaged by liquid reading it, such as if it comprises a fan driven by an electric motor, or steps may be taken to separate any liquid from the motor. Alternatively a non-electric pump may be used which is not affected by the passage of liquid therethrough.

Where a helix is shown in any of the drawings the angle of the helix is typically in the range 2° to 10° and preferably of the order of 4°.

What is claimed is:

1. A multi-stage particle/air separator for separating particles from particle laden air comprising:
   (1) a first stage comprising a cylindrical chamber, from one end of which internally extends a central member having apertures in the wall thereof remote from the said one end;
   (2) an air inlet in the chamber wall by which particle laden air enters the chamber tangentially near the said one end thereof;
   (3) a second dust/air separation stage to which air from the first stage chamber can pass via the openings in the wall of the central member;
   (4) suction means downstream of the separation stages for inducing air flow from the first stage to the second stage;
   (5) a particle collecting region at the end of the chamber remote from the said one end, into which the particles migrate as a result of being separated from the air passing into the central member;
   (6) that part of the central member adjacent the said one end of the chamber being cylindrical and unapertured and in combination with the cylindrical chamber defining an annular region therein, adjacent the air inlet thereto;
   (7) the annular region around the unapertured cylindrical region of the central member, and the incoming tangential airstream, combining to initiate a vortex within the chamber, so that incoming air is formed into a rotating mass of air in the chamber at the said one end thereof whereby centrifugal force causes heavier than air particles in the incoming air to migrate to the outer regions of the chamber, the suction causing axial migration of the rotating mass of air from the said one end of the chamber towards the other end thereof;
   (8) the suction force being selected so that heavier than air particles will tend to remain in the radially outer regions of the chamber near the wall of the chamber as they progress rotationally and axially along the chamber towards the particle collecting region while relatively particle free air will migrate radially inwardly to exit through the openings in the wall of the central member, wherein
   (9) the apertured region of the central member is a hemispherical or frusto-conical hollow shell which extends from the unapertured cylindrical region thereof towards the said other end of the chamber.

2. Apparatus as claimed in claim 1 wherein a skirt extends from the end of the central member beyond the region containing the openings in the wall thereof, to define a narrow annular gap between the skirt and the wall of the chamber, so that particles in the dust collecting region which due to turbulence may rise up in the region towards the central member, are prevented from reaching the openings therein unless they migrate radially outwardly to pass through the narrow annular gap against the flow of the incoming particles.

3. Apparatus as claimed in claim 2 wherein an annular flange is provided around the central member between the unapertured and apertured regions of the wall thereof, so as to force the vortex of rotating air within the chamber away from the central member as it progresses along the chamber.

4. Apparatus as claimed in claim 1 wherein particles. separated in a later separation stage are conveyed to a particle collecting region via a passage extending through the central member of the first stage.

5. Apparatus as claimed in claim 4 in which the passage communicates with the particle collecting region, of the cylindrical chamber of the first stage via valve means which is closed during air flow through the apparatus, and is opened after air flow ceases to allow particles collected upstream of the valve to pass into the particle collecting region of the chamber of the first stage.

6. Apparatus as claimed in claim 5 in which the valve means includes a closure member which is held in an open condition by spring means.

7. Apparatus as claimed in claim 4 in which the passage communicates with a particle collecting region, which is separate from the first stage particle collecting region, so that particles separated by the first stage are collected separately from particles separated by the later stage, of the multiple stage separator.

8. Apparatus as claimed of claim 1 wherein a passage extends through the central member from the openings in the wall thereof to an entrance in a second cylindrical chamber forming part of a second separation stage, through which air and any particles remaining therein pass from the first stage to the second stage, and the second cylindrical chamber is located downstream of the first chamber and is situated beyond the said one end of the first chamber, remote from the dust collecting region of the latter.

9. Apparatus as claimed in claim 8 wherein the entrance in the second cylindrical chamber causes air to enter the chamber tangentially and the chamber includes a hollow central member which extends axially thereof over at least part of its length from the end thereof furthest from the first chamber.

10. Apparatus as claimed in claim 9 wherein the free end of the hollow central member includes at least one opening therein to provide an outlet for air and any remaining particles to exit from the second chamber.

11. Apparatus as claimed in claim 9 wherein the free end of the hollow central member is closed but the wall of the central member has apertures therein through which air and any remaining particles can exit from the said second chamber.

12. Apparatus as claimed in claim 9 wherein a helical flange protrudes from the central member, thereby forcing circulating air in the second chamber to describe a helical path as it passes from one end of the chamber towards the other.

13. Apparatus as claimed in claim 9 wherein a rotatable turbine is located in the second chamber for rotation about the chamber axis, and the blades of the turbine are aligned relative to the entrance in the second chamber so that the incoming tangential airstream produces rotation thereof.

14. Apparatus as claimed in claim 8 wherein the said second chamber includes a first generally cylindrical region and a second region extending therefrom which is frusto conical and whose diameter progressively reduces from that of the cylindrical region in a direction away therefrom.

15. Apparatus as claimed in claim 14 wherein the second chamber includes a third region extending beyond the first frusto conical region, which is also frusto conical, but in which the diameter progressively reduces more slowly with axial distance from the cylindrical region than does the diameter of the first frusto conical region.

16. A multi-stage particle/air separator for separating particles from particle laden air comprising:
(1) a first stage comprising a cylindrical chamber, from one end of which internally extends a central member having apertures in the wall thereof remote from the said one end;
(2) an air inlet in the chamber wall by which particle laden air enters the chamber tangentially near the said one end thereof;
(3) a second dust/air separation stage to which air from the first stage chamber can pass via the openings in the wall of the central member;
(4) suction means for inducing air flow from the first stage to the second stage;
(5) a particle collecting region at the end of the chamber remote from the said one end, into which the particles migrate as a result of being separated from the air passing into the central member;
(6) that part of the central member adjacent the said one end of the chamber being cylindrical and unapertured and in combination with the cylindrical chamber defining an annular region therein, adjacent the air inlet thereto;
(7) the annular region around the unapertured cylindrical region of the central member, and the incoming tangential airstream, combining to initiate a vortex within the chamber, so that incoming air is formed into a rotating mass of air in the chamber at the said one end thereof whereby centrifugal force causes heavier than air particles in the incoming air to migrate to the outer regions of the chamber, the suction causing axial migration of the rotating mass of air from the said one end of the chamber towards the other end thereof;
(8) the suction force being selected so that heavier than air particles will tend to remain in the radially outer regions of the chamber near the wall of the chamber as they progress rotationally and axially along the chamber towards the particle collecting region while relatively particle free air will migrate radially inwardly to exit through the openings in the wall of the central member, wherein
(9) a passage extends through the central member from the openings in the wall thereof to an entrance in a second cylindrical chamber forming part of a second separation stage, through which air and any particles remaining therein pass from the first stage to the second stage,
(10) the said second chamber includes a first generally cylindrical region and a second region extending therefrom which is frusto conical and whose diameter progressively reduces from that of the cylindrical region in a direction away therefrom, and
(11) the second chamber includes a third region extending beyond the first frusto conical region, which is also frusto conical, but in which the diameter progressively reduces more slowly with axial distance from the cylindrical region than does the diameter of the first frusto conical region.

17. Apparatus as claimed in claim 16 wherein the included angle of the cone of which the frusto-conical surface if the second region of the second chamber forms a part lies in the range 100–140 degrees.

18. Apparatus as claimed in claim 1 which further includes a third stage located downstream from the second stage, for separating any particles remaining in the airstream which passes from the second stage to the third stage.

19. Apparatus as claimed in claim 18 wherein the central passage of the second stage communicates with the third stage to allow air to pass into the third stage from the second stage, the third stage is a generally cylindrical chamber, air enters the third stage generally centrally of one end of the chamber, the third stage includes a hollow central member and has a first outlet in the wall of the central member and a second outlet in the wall of the chamber, and a deflector is provided in the third stage to cause air entering the chamber to move radially outwardly so that any particles remaining in the air stream are radially displaced away from the centre of the chamber and axially away from the first outlet, in a direction to enter the second outlet.

20. Apparatus as claimed in claim 19 wherein the deflector comprises a conical lower end of the central member in the third stage, whose apex points towards the incoming airstream.

21. Apparatus as claimed in claim 19 wherein a helix extends around the central member to introduce rotational and axial movement of the airflow through the third stage and the second outlet is located axially beyond the exit end of the helix.

22. Apparatus as claimed in claim 19 wherein the first outlet comprises a plurality of small openings in the wall of the central member in the third stage.

23. Apparatus as claimed in claim 13 in which further includes a third stage located downstream from the second stage, for separating any particles remaining in the airstream which passes from the second stage to the third stage, and wherein the central passage of the second stage communicates with the third stage to allow air to pass into the third stage from the second stage, the third stage is a generally cylindrical chamber, air enters the third stage generally centrally of one end of the chamber, the third stage includes a hollow central member and has a first outlet in the wall of the central member and a second outlet in the wall of the chamber, and a deflector is provided in the third stage to cause air entering the chamber to move radially outwardly so that any particles remaining in the air stream are radially displaced away from the centre of the chamber and axially away from the first outlet, in a direction to enter the second outlet, and wherein the third stage includes a hollow rotary central member driven by the turbine in the second stage for imparting rotational motion to the incoming air stream entering the third stage and thereby causing particles remaining in the air entering the third stage to migrate outwardly under centrifugal force, and a second outlet in the third stage is located so as to collect any such particles for return to an earlier separation stage, and a first outlet is located at the opposite end of the chamber from the end in which the incoming air enters, so that after being rotated the air has to change direction and move axially through the chamber before it can leave via the first output.

24. Apparatus as claimed in claim 23 in which the second outlet communicates via a passage with a second inlet in the wall of the second stage chamber, which causes air entering the second stage chamber to do so tangentially of the chamber and in the same direction as the air is rotating in the second stage chamber.

25. Apparatus as claimed in Maim 1 further including level detection means in a particle collecting region to initiate an alarm in the event that the particles collected therein exceed a given volume.

* * * * *